United States Patent
Ko et al.

(10) Patent No.: US 10,268,979 B2
(45) Date of Patent: Apr. 23, 2019

(54) INTERMEDIATE RESOURCE ALLOCATION TRACKING IN DATA MODELS

(71) Applicant: Apptio, Inc., Bellevue, WA (US)

(72) Inventors: Supin Ko, Seattle, WA (US); Paul Damien McLachlan, Newcastle, WA (US); Justin Alexander Friedl, Issaquah, WA (US)

(73) Assignee: Apptio, Inc., Bellevue, WA (US)

( * ) Notice: Subject to any disclaimer, the term of this patent is extended or adjusted under 35 U.S.C. 154(b) by 0 days.

(21) Appl. No.: 14/867,552

(22) Filed: Sep. 28, 2015

(65) Prior Publication Data

US 2017/0091678 A1    Mar. 30, 2017

(51) Int. Cl.
  *G06Q 10/00*  (2012.01)
  *G06Q 10/06*  (2012.01)

(52) U.S. Cl.
  CPC .................. *G06Q 10/067* (2013.01)

(58) Field of Classification Search
  CPC .......................................... G06Q 10/00–50/00
  USPC ............................................... 705/7.11–7.42
  See application file for complete search history.

(56) References Cited

U.S. PATENT DOCUMENTS

| | | | |
|---|---|---|---|
| 4,744,026 A | 5/1988 | Vanderbei | |
| 5,249,120 A | 9/1993 | Foley | |
| 5,615,121 A | 3/1997 | Babayev et al. | |
| 5,721,919 A | 2/1998 | Morel et al. | |
| 5,758,327 A | 5/1998 | Gardner et al. | |
| 5,799,286 A | 8/1998 | Morgan et al. | |
| 5,802,508 A | 9/1998 | Morgenstern | |
| 5,903,453 A | 5/1999 | Stoddard, II | |
| 5,970,476 A | 10/1999 | Fahey | |
| 5,991,741 A | 11/1999 | Speakman et al. | |
| 6,014,640 A * | 1/2000 | Bent | G06Q 40/02 705/30 |
| 6,032,123 A | 2/2000 | Jameson | |

(Continued)

FOREIGN PATENT DOCUMENTS

JP    2011134268 A    7/2011

OTHER PUBLICATIONS

Official Communication for U.S. Appl. No. 13/935,147 dated Mar. 9, 2016, 10 pages.

(Continued)

*Primary Examiner* — Alan S Miller
(74) *Attorney, Agent, or Firm* — John W. Branch; Lowe Graham Jones PLLC

(57) ABSTRACT

Embodiments are directed towards intermediate resource allocation tracking in data models. A data model that includes data objects traversed on a path through the data model that follows allocation rules that are included in the data model. If an aspect object is encountered during the traversal, resources from line items of a source data object are associated with line items of the aspect object based on the traversal path. The resources associated with the line items of the aspect object are also available for allocation to other data objects. If a data object, rather than an aspect object, may be encountered during the traversal, resources from line items of a source data object may be allocated to line items of the data object based on another of the allocation rules, the resources allocated to the line items of the data object are unavailable for further allocation.

24 Claims, 10 Drawing Sheets

(56) References Cited

U.S. PATENT DOCUMENTS

| | | | |
|---|---|---|---|
| 6,047,290 A | 4/2000 | Kennedy et al. | |
| 6,208,993 B1 | 3/2001 | Shadmon | |
| 6,249,769 B1 | 6/2001 | Ruffin et al. | |
| 6,253,192 B1 | 6/2001 | Corlett et al. | |
| 6,308,166 B1 | 10/2001 | Breuker et al. | |
| 6,321,207 B1 | 11/2001 | Ye | |
| 6,330,552 B1 | 12/2001 | Farrar et al. | |
| 6,424,969 B1 | 7/2002 | Gruenwald | |
| 6,507,825 B2 | 1/2003 | Suh | |
| 6,578,005 B1 | 6/2003 | Lesaint et al. | |
| 6,594,672 B1 | 7/2003 | Lampson et al. | |
| 6,647,370 B1 | 11/2003 | Fu et al. | |
| 6,738,736 B1 | 5/2004 | Bond | |
| 6,789,252 B1 | 9/2004 | Burke et al. | |
| 6,832,212 B1 | 12/2004 | Zenner et al. | |
| 6,839,719 B2 | 1/2005 | Wallace | |
| 6,877,034 B1 | 4/2005 | Machin et al. | |
| 6,882,630 B1 | 4/2005 | Seaman | |
| 6,965,867 B1* | 11/2005 | Jameson | G06Q 10/06 700/100 |
| 6,983,321 B2 | 1/2006 | Trinon et al. | |
| 7,050,997 B1 | 5/2006 | Wood, Jr. | |
| 7,130,822 B1 | 10/2006 | Their et al. | |
| 7,149,700 B1 | 12/2006 | Munoz et al. | |
| 7,177,850 B2 | 2/2007 | Argenton et al. | |
| 7,263,527 B1 | 8/2007 | Malcolm | |
| 7,305,491 B2 | 12/2007 | Miller et al. | |
| 7,308,427 B1 | 12/2007 | Hood | |
| 7,321,869 B1 | 1/2008 | Phibbs, Jr. | |
| 7,386,535 B1 | 6/2008 | Kalucha et al. | |
| 7,418,438 B2 | 8/2008 | Gould et al. | |
| 7,505,888 B2 | 3/2009 | Legault et al. | |
| 7,590,937 B2 | 9/2009 | Jacobus et al. | |
| 7,634,431 B2 | 12/2009 | Stratton | |
| 7,653,449 B2 | 1/2010 | Hunter et al. | |
| 7,664,729 B2 | 2/2010 | Klein et al. | |
| 7,703,003 B2 | 4/2010 | Payne et al. | |
| 7,725,343 B2 | 5/2010 | Johanson et al. | |
| 7,742,961 B2 | 6/2010 | Aaron et al. | |
| 7,752,077 B2 | 7/2010 | Holden et al. | |
| 7,761,548 B2 | 7/2010 | Snyder et al. | |
| 7,769,654 B1 | 8/2010 | Hurewitz | |
| 7,774,458 B2 | 8/2010 | Trinon et al. | |
| 7,783,759 B2 | 8/2010 | Eilam et al. | |
| 7,801,755 B2 | 9/2010 | Doherty et al. | |
| 7,805,400 B2 | 9/2010 | Teh et al. | |
| 7,813,948 B2 | 10/2010 | Ratzloff | |
| 7,852,711 B1 | 12/2010 | Fitzgerald et al. | |
| 7,870,051 B1 | 1/2011 | En et al. | |
| 7,877,742 B2 | 1/2011 | Duale et al. | |
| 7,899,235 B1 | 3/2011 | Williams et al. | |
| 7,917,555 B2 | 3/2011 | Gottumukkala et al. | |
| 7,930,396 B2 | 4/2011 | Trinon et al. | |
| 7,933,861 B2 | 4/2011 | Zadorozhny | |
| 7,945,489 B2 | 5/2011 | Weiss et al. | |
| 7,966,235 B1* | 6/2011 | Capelli | G06Q 10/10 705/35 |
| 7,966,266 B2 | 6/2011 | Delvat | |
| 8,010,584 B1 | 8/2011 | Craver et al. | |
| 8,024,241 B2 | 9/2011 | Bailey et al. | |
| 8,073,724 B2 | 12/2011 | Harthcryde et al. | |
| 8,121,959 B2 | 2/2012 | Delvat | |
| 8,175,863 B1 | 5/2012 | Ostermeyer et al. | |
| 8,195,524 B2 | 6/2012 | Sandholm et al. | |
| 8,195,785 B2 | 6/2012 | Snyder et al. | |
| 8,200,518 B2 | 6/2012 | Bailey et al. | |
| 8,200,561 B1 | 6/2012 | Scott et al. | |
| 8,209,218 B1 | 6/2012 | Basu et al. | |
| 8,214,829 B2 | 7/2012 | Neogi et al. | |
| 8,260,959 B2 | 9/2012 | Rudkin et al. | |
| 8,370,243 B1 | 2/2013 | Cernyar | |
| 8,396,775 B1 | 3/2013 | Mindlin | |
| 8,423,428 B2 | 4/2013 | Grendel et al. | |
| 8,484,355 B1 | 7/2013 | Lochhead et al. | |
| 8,543,438 B1 | 9/2013 | Fleiss | |
| 8,600,830 B2 | 12/2013 | Hoffberg | |
| 8,601,263 B1 | 12/2013 | Shankar et al. | |
| 8,606,827 B2 | 12/2013 | Williamson | |
| 8,655,714 B2 | 2/2014 | Weir et al. | |
| 8,667,385 B1 | 3/2014 | Mui et al. | |
| 8,766,981 B2 | 7/2014 | McLachlan et al. | |
| 8,768,976 B2 | 7/2014 | McLachlan et al. | |
| 8,826,230 B1 | 8/2014 | Michelsen | |
| 8,935,301 B2 | 1/2015 | Chmiel et al. | |
| 8,937,618 B2 | 1/2015 | Erez et al. | |
| 8,970,476 B2 | 3/2015 | Chan | |
| 8,996,552 B2 | 3/2015 | Mukes et al. | |
| 9,015,692 B1 | 4/2015 | Clavel | |
| 9,020,830 B2 | 4/2015 | Purpus et al. | |
| 9,104,661 B1 | 8/2015 | Evans | |
| 9,213,573 B2 | 12/2015 | French et al. | |
| 9,281,012 B2 | 3/2016 | Hedges | |
| 9,384,511 B1 | 7/2016 | Purpus | |
| 9,529,863 B1* | 12/2016 | Gindin | G06Q 40/00 |
| 9,805,311 B1 | 10/2017 | Mohler | |
| 2002/0002557 A1 | 1/2002 | Straube et al. | |
| 2002/0016752 A1 | 2/2002 | Suh | |
| 2002/0056004 A1 | 5/2002 | Smith | |
| 2002/0069102 A1 | 6/2002 | Vellante et al. | |
| 2002/0082966 A1 | 6/2002 | O'Brien et al. | |
| 2002/0107914 A1* | 8/2002 | Charisius | G06Q 10/06 709/203 |
| 2002/0123945 A1 | 9/2002 | Booth et al. | |
| 2002/0145040 A1 | 10/2002 | Grabski, III | |
| 2002/0156710 A1 | 10/2002 | Ryder | |
| 2002/0174049 A1 | 11/2002 | Kitahara | |
| 2002/0178198 A1 | 11/2002 | Steele | |
| 2002/0194329 A1 | 12/2002 | Ailing | |
| 2003/0019350 A1 | 1/2003 | Khosla | |
| 2003/0074269 A1 | 4/2003 | Viswanath | |
| 2003/0083388 A1 | 5/2003 | L'Alloret | |
| 2003/0083888 A1 | 5/2003 | Argenton et al. | |
| 2003/0083912 A1 | 5/2003 | Covington et al. | |
| 2003/0093310 A1 | 5/2003 | Macrae | |
| 2003/0110113 A1 | 6/2003 | Martin | |
| 2003/0139960 A1 | 7/2003 | Nishikawa et al. | |
| 2003/0139986 A1 | 7/2003 | Roberts, Jr. | |
| 2003/0158724 A1 | 8/2003 | Uchida | |
| 2003/0158766 A1 | 8/2003 | Mital et al. | |
| 2003/0172018 A1 | 9/2003 | Chen et al. | |
| 2003/0172368 A1 | 9/2003 | Alumbaugh et al. | |
| 2003/0195780 A1 | 10/2003 | Arora et al. | |
| 2003/0208493 A1 | 11/2003 | Hall et al. | |
| 2003/0217033 A1 | 11/2003 | Sandler et al. | |
| 2003/0233301 A1 | 12/2003 | Chen et al. | |
| 2003/0236721 A1 | 12/2003 | Plumer et al. | |
| 2004/0030628 A1 | 2/2004 | Takamoto et al. | |
| 2004/0039685 A1 | 2/2004 | Hambrecht et al. | |
| 2004/0059611 A1 | 3/2004 | Kananghinis et al. | |
| 2004/0059679 A1 | 3/2004 | Mizumachi et al. | |
| 2004/0073477 A1 | 4/2004 | Heyns et al. | |
| 2004/0093344 A1 | 5/2004 | Berger et al. | |
| 2004/0111509 A1 | 6/2004 | Eilam et al. | |
| 2004/0133676 A1 | 7/2004 | Sproule | |
| 2004/0138942 A1 | 7/2004 | Pearson et al. | |
| 2004/0186762 A1 | 9/2004 | Beaven et al. | |
| 2004/0243438 A1 | 12/2004 | Mintz | |
| 2004/0249737 A1 | 12/2004 | Tofte | |
| 2005/0004856 A1 | 1/2005 | Brose et al. | |
| 2005/0033631 A1 | 2/2005 | Wefers et al. | |
| 2005/0038788 A1 | 2/2005 | Dettinger et al. | |
| 2005/0044224 A1 | 2/2005 | Jun et al. | |
| 2005/0060298 A1 | 3/2005 | Agapi et al. | |
| 2005/0060317 A1 | 3/2005 | Lott et al. | |
| 2005/0071285 A1 | 3/2005 | Laicher et al. | |
| 2005/0091102 A1 | 4/2005 | Retsina | |
| 2005/0120032 A1 | 6/2005 | Liebich et al. | |
| 2005/0131870 A1 | 6/2005 | Krishnaswamy et al. | |
| 2005/0131929 A1* | 6/2005 | Bailey | G06F 17/30592 |
| 2005/0144110 A1 | 6/2005 | Chen et al. | |
| 2005/0171918 A1 | 8/2005 | Eden et al. | |
| 2005/0235020 A1 | 10/2005 | Gabelmann et al. | |
| 2005/0246482 A1 | 11/2005 | Gabelmann et al. | |
| 2006/0010156 A1 | 1/2006 | Netz et al. | |

(56) References Cited

U.S. PATENT DOCUMENTS

| | | |
|---|---|---|
| 2006/0010294 A1 | 1/2006 | Pasumansky et al. |
| 2006/0041458 A1 | 2/2006 | Ringrose et al. |
| 2006/0041501 A1 | 2/2006 | Tabata et al. |
| 2006/0059032 A1 | 3/2006 | Wong et al. |
| 2006/0074980 A1 | 4/2006 | Sarkar |
| 2006/0080264 A1 | 4/2006 | Zhang et al. |
| 2006/0085302 A1 | 4/2006 | Weiss et al. |
| 2006/0085465 A1 | 4/2006 | Nori et al. |
| 2006/0106658 A1* | 5/2006 | Johanson ............... G06Q 10/06 705/7.37 |
| 2006/0116859 A1 | 6/2006 | Legault et al. |
| 2006/0116975 A1 | 6/2006 | Gould et al. |
| 2006/0126552 A1 | 6/2006 | Lee et al. |
| 2006/0136281 A1 | 6/2006 | Peters et al. |
| 2006/0143219 A1 | 6/2006 | Smith et al. |
| 2006/0161879 A1 | 7/2006 | Lubrecht et al. |
| 2006/0167703 A1 | 7/2006 | Yakov |
| 2006/0178960 A1 | 8/2006 | Lepman |
| 2006/0179012 A1 | 8/2006 | Jacobs |
| 2006/0190497 A1 | 8/2006 | Inturi et al. |
| 2006/0200400 A1 | 9/2006 | Hunter et al. |
| 2006/0200477 A1 | 9/2006 | Barrenechea |
| 2006/0212146 A1 | 9/2006 | Johnson et al. |
| 2006/0212334 A1 | 9/2006 | Jackson |
| 2006/0224740 A1 | 10/2006 | Sievers-Testes |
| 2006/0224946 A1 | 10/2006 | Barrett et al. |
| 2006/0228654 A1 | 10/2006 | Sanjar et al. |
| 2006/0235785 A1 | 10/2006 | Chait et al. |
| 2006/0259468 A1 | 11/2006 | Brooks et al. |
| 2006/0277074 A1 | 12/2006 | Einav et al. |
| 2006/0282429 A1 | 12/2006 | Hernandez-Sherrington et al. |
| 2007/0038494 A1 | 2/2007 | Kreitzbert et al. |
| 2007/0088641 A1 | 4/2007 | Aaron et al. |
| 2007/0113289 A1 | 5/2007 | Blumenau |
| 2007/0118516 A1 | 5/2007 | Li et al. |
| 2007/0124162 A1 | 5/2007 | Mekyska |
| 2007/0179975 A1 | 8/2007 | Teh et al. |
| 2007/0198317 A1 | 8/2007 | Harthcryde et al. |
| 2007/0198982 A1 | 8/2007 | Bolan et al. |
| 2007/0214413 A1 | 9/2007 | Boeckenhauer |
| 2007/0226064 A1 | 9/2007 | Yu et al. |
| 2007/0226090 A1* | 9/2007 | Stratton ............... G06Q 10/00 705/30 |
| 2007/0233439 A1 | 10/2007 | Carroll et al. |
| 2007/0260532 A1 | 11/2007 | Blake, III |
| 2007/0265896 A1 | 11/2007 | Smith |
| 2007/0271203 A1 | 11/2007 | Delvat |
| 2007/0276755 A1 | 11/2007 | Rapp |
| 2007/0282626 A1 | 12/2007 | Zhang et al. |
| 2008/0027957 A1 | 1/2008 | Bruckner et al. |
| 2008/0033774 A1 | 2/2008 | Kimbrel et al. |
| 2008/0059945 A1 | 3/2008 | Sauer et al. |
| 2008/0060058 A1 | 3/2008 | Shea et al. |
| 2008/0065435 A1* | 3/2008 | Ratzloff ............... G06Q 10/00 705/7.37 |
| 2008/0071844 A1 | 3/2008 | Gopal et al. |
| 2008/0082186 A1 | 4/2008 | Hood et al. |
| 2008/0082435 A1 | 4/2008 | O'Brien et al. |
| 2008/0120122 A1 | 5/2008 | Olenski et al. |
| 2008/0201269 A1 | 8/2008 | Hollins et al. |
| 2008/0201297 A1 | 8/2008 | Choi et al. |
| 2008/0208647 A1 | 8/2008 | Hawley et al. |
| 2008/0208667 A1 | 8/2008 | Lymbery et al. |
| 2008/0222638 A1 | 9/2008 | Beaty et al. |
| 2008/0239393 A1 | 10/2008 | Navon |
| 2008/0255912 A1 | 10/2008 | Christiansen et al. |
| 2008/0295096 A1 | 11/2008 | Beaty et al. |
| 2008/0312979 A1 | 12/2008 | Lee et al. |
| 2008/0319811 A1 | 12/2008 | Casey |
| 2009/0012986 A1 | 1/2009 | Arazi et al. |
| 2009/0013325 A1 | 1/2009 | Kobayashi et al. |
| 2009/0018880 A1* | 1/2009 | Bailey ............... G06Q 10/06 705/7.37 |
| 2009/0063251 A1 | 3/2009 | Rangarajan et al. |
| 2009/0063540 A1 | 3/2009 | Mattox et al. |
| 2009/0100017 A1 | 4/2009 | Graves et al. |
| 2009/0100406 A1 | 4/2009 | Greenfield et al. |
| 2009/0144120 A1 | 6/2009 | Ramachandran |
| 2009/0150396 A1 | 6/2009 | Elisha et al. |
| 2009/0195350 A1 | 8/2009 | Tsern et al. |
| 2009/0198535 A1 | 8/2009 | Brown et al. |
| 2009/0199192 A1 | 8/2009 | Laithwaite et al. |
| 2009/0210275 A1 | 8/2009 | Andreev et al. |
| 2009/0216580 A1* | 8/2009 | Bailey ............... G06Q 10/063 705/7.27 |
| 2009/0234892 A1 | 9/2009 | Anglin et al. |
| 2009/0300173 A1 | 12/2009 | Bakman et al. |
| 2009/0319316 A1 | 12/2009 | Westerfeld et al. |
| 2010/0005014 A1 | 1/2010 | Castle et al. |
| 2010/0005173 A1 | 1/2010 | Baskaran et al. |
| 2010/0017344 A1 | 1/2010 | Hambrecht et al. |
| 2010/0042455 A1* | 2/2010 | Liu ............... G06Q 10/06 705/7.12 |
| 2010/0049494 A1 | 2/2010 | Radibratovic et al. |
| 2010/0082380 A1 | 4/2010 | Merrifield, Jr. et al. |
| 2010/0094740 A1 | 4/2010 | Richter |
| 2010/0125473 A1 | 5/2010 | Tung et al. |
| 2010/0153282 A1 | 6/2010 | Graham |
| 2010/0161371 A1 | 6/2010 | Cantor et al. |
| 2010/0161634 A1 | 6/2010 | Caceres |
| 2010/0169477 A1 | 7/2010 | Stienhans et al. |
| 2010/0185557 A1 | 7/2010 | Hunter et al. |
| 2010/0198750 A1 | 8/2010 | Ron et al. |
| 2010/0211667 A1 | 8/2010 | O'Connell, Jr. |
| 2010/0250419 A1 | 9/2010 | Arff et al. |
| 2010/0250421 A1 | 9/2010 | Ariff et al. |
| 2010/0250642 A1 | 9/2010 | Yellin et al. |
| 2010/0293163 A1 | 11/2010 | McLachlan et al. |
| 2010/0299233 A1 | 11/2010 | Licardi et al. |
| 2010/0306382 A1 | 12/2010 | Cardosa et al. |
| 2010/0325506 A1 | 12/2010 | Cai et al. |
| 2010/0325606 A1 | 12/2010 | Sundararajan et al. |
| 2010/0332262 A1 | 12/2010 | Horvitz et al. |
| 2010/0333109 A1 | 12/2010 | Milnor |
| 2011/0016214 A1 | 1/2011 | Jackson |
| 2011/0016448 A1 | 1/2011 | Bauder et al. |
| 2011/0022861 A1 | 1/2011 | Agneeswaran et al. |
| 2011/0066472 A1 | 3/2011 | Scheider |
| 2011/0066628 A1 | 3/2011 | Jayaraman |
| 2011/0072340 A1 | 3/2011 | Miller |
| 2011/0106691 A1 | 5/2011 | Clark et al. |
| 2011/0107254 A1 | 5/2011 | Moroze |
| 2011/0167034 A1 | 7/2011 | Knight et al. |
| 2011/0196795 A1 | 8/2011 | Pointer |
| 2011/0225277 A1 | 9/2011 | Freimuth et al. |
| 2011/0295766 A1 | 12/2011 | Tompkins |
| 2011/0313947 A1 | 12/2011 | Grohovaz |
| 2012/0016811 A1 | 1/2012 | Jones |
| 2012/0023170 A1 | 1/2012 | Matignon et al. |
| 2012/0066020 A1 | 3/2012 | Moon et al. |
| 2012/0116990 A1 | 5/2012 | Huang |
| 2012/0131591 A1 | 5/2012 | Moorthi et al. |
| 2012/0150736 A1 | 6/2012 | Dickerson et al. |
| 2012/0185368 A1 | 7/2012 | Schloter et al. |
| 2012/0232947 A1 | 9/2012 | McLachlan et al. |
| 2012/0233217 A1 | 9/2012 | Purpus et al. |
| 2012/0233547 A1 | 9/2012 | McLachlan |
| 2012/0239739 A1 | 9/2012 | Manglik et al. |
| 2012/0246046 A1 | 9/2012 | Hirsch |
| 2012/0272234 A1 | 10/2012 | Kaiser et al. |
| 2012/0330869 A1 | 12/2012 | Durham |
| 2013/0028537 A1 | 1/2013 | Miyake et al. |
| 2013/0041819 A1 | 2/2013 | Khasho |
| 2013/0060595 A1 | 3/2013 | Bailey |
| 2013/0091456 A1 | 4/2013 | Sherman et al. |
| 2013/0091465 A1 | 4/2013 | Kikin-Gil et al. |
| 2013/0103369 A1 | 4/2013 | Huynh et al. |
| 2013/0103654 A1 | 4/2013 | McLachlan et al. |
| 2013/0124459 A1 | 5/2013 | Iwase et al. |
| 2013/0138470 A1 | 5/2013 | Goyal et al. |
| 2013/0179371 A1 | 7/2013 | Jain et al. |
| 2013/0201193 A1 | 8/2013 | McLachlan et al. |
| 2013/0227584 A1 | 8/2013 | Greene et al. |
| 2013/0268307 A1 | 10/2013 | Li et al. |

(56) References Cited

U.S. PATENT DOCUMENTS

| | | |
|---|---|---|
| 2013/0282537 A1 | 10/2013 | Snider |
| 2013/0290470 A1 | 10/2013 | CaraDonna et al. |
| 2013/0293551 A1 | 11/2013 | Erez et al. |
| 2013/0339274 A1 | 12/2013 | Willis et al. |
| 2013/0346390 A1 | 12/2013 | Jerzak et al. |
| 2014/0006085 A1 | 1/2014 | McLachlan et al. |
| 2014/0006222 A1 | 1/2014 | Hericks et al. |
| 2014/0067632 A1 | 3/2014 | Curtis |
| 2014/0075004 A1* | 3/2014 | Van Dusen ............. H04L 41/04 709/223 |
| 2014/0089509 A1 | 3/2014 | Akolkar et al. |
| 2014/0122374 A1 | 5/2014 | Hacigumus et al. |
| 2014/0129583 A1 | 5/2014 | Munkes et al. |
| 2014/0136295 A1 | 5/2014 | Wasser |
| 2014/0143175 A1 | 5/2014 | Greenshields et al. |
| 2014/0172918 A1 | 6/2014 | Kornmann et al. |
| 2014/0229212 A1* | 8/2014 | MacElheron .......... G06Q 10/06 705/7.15 |
| 2014/0244364 A1 | 8/2014 | Evers |
| 2014/0257928 A1 | 9/2014 | Chen et al. |
| 2014/0278459 A1 | 9/2014 | Morris |
| 2014/0279121 A1 | 9/2014 | George et al. |
| 2014/0279201 A1 | 9/2014 | Iyoob et al. |
| 2014/0279676 A1* | 9/2014 | Schafer ................ G06Q 10/067 705/348 |
| 2014/0279947 A1 | 9/2014 | Chachra et al. |
| 2014/0288987 A1 | 9/2014 | Liu |
| 2014/0310233 A1 | 10/2014 | Catalano et al. |
| 2014/0351166 A1 | 11/2014 | Schlossberg |
| 2014/0365503 A1 | 12/2014 | Franceschini et al. |
| 2014/0365504 A1 | 12/2014 | Franceschini et al. |
| 2015/0006552 A1 | 1/2015 | Lord |
| 2015/0012328 A1 | 1/2015 | McLachlan et al. |
| 2015/0066808 A1 | 3/2015 | Legare et al. |
| 2015/0074075 A1 | 3/2015 | Alexander |
| 2015/0088584 A1 | 3/2015 | Santiago, III et al. |
| 2015/0227991 A1 | 8/2015 | Yu |
| 2015/0302303 A1 | 10/2015 | Hakim |
| 2015/0341230 A1 | 11/2015 | Dave et al. |
| 2015/0363725 A1 | 12/2015 | Anderson et al. |
| 2015/0379061 A1 | 12/2015 | Paraschivescu |
| 2016/0063577 A1 | 3/2016 | Yellin et al. |
| 2018/0068246 A1 | 3/2018 | Crivat et al. |

OTHER PUBLICATIONS

Official Communication for U.S. Appl. No. 14/033,130 dated Feb. 18, 2016, 22 pages.
International Search Report and Written Opinion for PCT/US2015/048697 dated Mar. 31, 2016, 9 pages.
Office Communication for U.S. Appl. No. 13/365,150, dated Apr. 6, 2016, 11 pages.
Office Communication for U.S. Appl. No. 14/722,663, dated Mar. 31, 2016, 5 pages.
Van Diessen et al., "Component Business Model for Digital Repositories: A Framework for Analysis," AAAI, 2008, 7 pages.
Melcher et al., "Visualization and Clustering of Business Process Collections Based on Process Metric Values," IEEE Computer Society, 2008, 4 pages.
Lee et al., "Value-Centric, Model-Driven Business Transformation," IEEE, 2008, 8 pages.
Lee et al., "Business Transformation Workbench: A Practitioner's Tool for Business Transformation," IEEE International Conference on Services Computing, 2008, 8 pages.
Risch et al., "Interactive Information Visualization for Exploratory Intelligence Data Analysis," IEEE Proceedings of VRAIS, 1996, 10 pages.
Office Communication for U.S. Appl. No. 13/415,797, dated Apr. 4, 2016, 24 pages.
Office Communication for U.S. Appl. No. 13/837,815, dated Apr. 13, 2016, 22 pages.

"Activity Based Costing is the best allocation methodology," APPTIO, Community for Technology Business Management, Mar. 16, 2010, 2 pages.
"Amazon Elastic Computer Cloud (Amazon EC2)", archive.org, Oct. 21, 2011, 9 pages http://web.archive.org/web/20111029130914/http://aws.amazon.com/ec2/#pricing.
"Apptio Extends Leadership in Cloud Business Management with Launch of Apptio Cloud Express," Apptio, Dec. 12, 2012, 2 pages http://www.apptio.com/news/apptio-extends-leadership-cloud-business-management-launch-apptio-cloud-express#.Ukm4r8X7Lco.
"Apptio Optimizes Enterprise IT Costs Utilizing Amazon Web Services Cloud Computing," Apptio, Apr. 7, 2009, 2 pages http://www.apptio.com/news/apptio-optimizes-enterprise-it-costs-utilizing-amazon-web-services-cloud-computing#.Ukm5XsX7Lco.
"Automating Cost Transparency," Apptio, 2008, 15 pages htto://www.cio.com/documents/whitepapers/AutomatedCostTransparency.pdf.
"Cloud Computing and Sustainability: The Environmental Benefits of Moving to the Cloud," Accenture. archive.org, Aug. 31, 2011, 17 pages http://web.archive.org/web/20110813022626/http://www.accenture.com/SiteCollectionDocuments/PDF/Accenture_Sustainability_Cloud_Computing_TheEnvironmentalBenefitsofMovingtotheCloud.pdf.
"IT Cost Transparency and Apptio," Dec. 4, 2008, 2 pages http://web.archive.org/web/20081204012158/http://www.apptio.com/solutions.
"Notice from the European Patent Office dated Oct. 1, 2007 concerning business methods," Official Journal EPO, dated Nov. 2007, pp. 592-593.
"Program Evaluation and Review Technique," Wikipedia, the free encyclopedia, accessed Mar. 13, 2012, 10 pages http://en.wikipedia.org/wiki/Program_Evaluation_and_Review_Technique—last modified Mar. 12, 2012.
"Project Management," Wikipedia, the free encyclopedia, accessed Mar. 13, 2012. 14 pages http://en.wikipedia.org/wiki/Project_management—last modified Mar. 7, 2012.
"Visualization for Production Management: Treemap and Fisheye Table Browser," Open-Video Organization webpages, 2001, 2 pages http://www.open-video.org/details.php?videoid=4547.
Busch, J., "Six Strategies for IT Cost Allocation," Spend Matters, Jan. 5, 2011, 3 pages http://spendmatters.com/2011/01/05/six-strategies-for-it-cost-allocation/.
Morgan, T. P., "Apptio puffs up freebie cost control freak for public clouds," The Register, Dec. 12, 2012, 2 pages http://www.theregister.co.uk/2012/12/12/apptio_cloud_express.
Ricknäs, M., "Apptio unveils tool to keep track of cloud costs," ComputerWorld, Dec. 12, 2012, 1 page http://www.computerworld.com/s/article/9234630/Apptio_unveils_tool_to_keep_track_of_cloud_costs.
Talbot, C., "Apptio Cloud Express Provides Free Usage Tracking Service," talkincloud.com, Dec. 12, 2012, 4 pages http://talkincloud.com/cloud-computing-management/apptio-cloud-express-provides-free-usage-tracking-service.
Vizard, M., "Free Service from Apptio Tracks Cloud Service Provider Pricing," IT Business Edge, Dec. 12, 2012, 6 pages http://www.itbusinessedge.com/blogs/it-unmasked/free-service-from-apptio-tracks-cloud-service-provider-pricing.html.
International Search Report and Written Opinion for International Patent Application No. PCT/US2010/035021 dated Jul. 14, 2010.
International Preliminary Report on Patentability for International Patent Application No. PCT/US2010/035021 dated Nov. 24, 2011.
International Search Report and Written Opinion for International Patent Application No. PCT/US2012/028353 dated Oct. 31, 2012.
International Preliminary Report on Patentability for International Patent Application No. PCT/US2012/028353 dated Sep. 19, 2013.
International Search Report and Written Opinion for International Patent Application No. PCT/US2012/028378 dated Sep. 12. 2012.
International Preliminary Report on Patentability for International Patent Application No. PCT/US2012/028378 dated Sep. 19, 2013.
Extended European Search Report in EP Application No. 13151967.0-1955, dated Apr. 19, 2013.
Official Communication for U.S. Appl. No. 12/467,120 dated Oct. 4, 2011.

(56) References Cited

OTHER PUBLICATIONS

Official Communication for U.S. Appl. No. 12/467,120 dated Jun. 20, 2012.
Official Communication for U.S. Appl. No. 12/467,120 dated Aug. 29, 2012.
Official Communication for U.S. Appl. No. 12/467,120 dated Oct. 23, 2013.
Official Communication for U.S. Appl. No. 12/467,120 dated Mar. 26, 2013.
Official Communication for U.S. Appl. No. 13/324,253 dated Sep. 25, 2012.
Official Communication for U.S. Appl. No. 13/324,253 dated Jan. 10, 2013.
Official Communication for U.S. Appl. No. 13/324,253 dated Mar. 19, 2013.
Official Communication for U.S. Appl. No. 13/324,253 dated Sep. 6, 2013.
Official Communication for U.S. Appl. No. 13/415,797 dated Oct. 3, 2013.
Official Communication for U.S. Appl. No. 13/452,628 dated Apr. 22, 2013.
Official Communication for U.S. Appl. No. 13/675,837 dated Oct. 10, 2013.
Official Communication for U.S. Appl. No. 13/837,815 dated Oct. 23, 2013.
Official Communication for U.S. Appl. No. 13/917,478 dated Nov. 7, 2013.
Official Communication for U.S. Appl. No. 13/917,503 dated Oct. 10, 2013.
Official Communication for U.S. Appl. No. 13/935,147 dated Oct. 22, 2013.
Office Communication for U.S. Appl. No. 13/649,019 dated Sep. 23, 2015.
Office Communication for U.S. Appl. No. 13/365,150 dated Sep. 24, 2015.
Office Communication for U.S. Appl. No. 14/033,130 dated Sep. 15, 2015.
Official Communication on for U.S. Appl. No. 13/452,628 dated Jan. 12, 2016, 21 pages.
Official Communication for U.S. Appl. No. 13/649,019 dated Jan. 4, 2016, 8 pages.
European Examination Report for Application No. 14159413.5 dated Jul. 15, 2015, 9 pages.
Office Communication for U.S. Appl. No. 13/415,701 dated Oct. 27, 2015, 16 pages.
Official Communication for U.S. Appl. No. 14/869,721 dated Jan. 13, 2016, 57 pages.
Office Communication for U.S. Appl. No. 13/675,837 dated Oct. 26, 2015, 20 pages.
Office Communication for U.S. Appl. No. 13/917,503 dated Oct. 22, 2015, 19 pages.
Office Communication for U.S. Appl. No. 14/722,663 dated Dec. 1, 2015, 37 pages.
Chien-Liang Fok et al., "Rapid Development and Flexible Deployment of Adaptive Wireless Sensor Network Applications," Proceedings of the 25th IEEE International Conference on Distributed Computing Systems, 2005, pp. 653-662 (10 pages).
Frans Flippo et al., "A Framework for Rapid Development of Multimodal interfaces," Proceedings of the 5th International Conference on Multimodal Interfaces, 2003, pp. 109-116 (8 pages).
David B. Stewart et al., "Rapid Development of Robotic Applications Using Component-Based Real-Time Software," Intelligent Robots and Systems 1995, Human Robot Interaction and Cooperative Robots Proceedings, 1995, IEEE International Conference on vol. 1, pp. 465-470 (6 pages).
Office Communication for U.S. Appl. No. 14/846,349 dated Dec. 17, 2015, 23 pages.
Office Communication for U.S. Appl. No. 13/365,150 dated Dec. 7, 2015, 3 pages.
Official Communication for U.S. Appl. No. 14/869,721 dated Jun. 1, 2016, 35 pages.
Official Communication for U.S. Appl. No. 14/977,368 dated Jun. 7, 2016, 11 pages.
Office Communication for U.S. Appl. No. 14/971,944, dated May 19, 2016, 17 pages.
Stephen Muller and Hasso Platner, "An In-Depth Analysis of Data Aggregation Cost Factors in a Columnar In-Memory Database", ACM DOLAP'12, Nov. 2, 2012, Maui, Hawaii, USA, pp. 65-72.
Office Communication for U.S. Appl. No. 14/033,130, dated Apr. 25, 2016, 4 pages.
Official Communication for U.S. Appl. No. 13/837,815 dated Jun. 23, 2016, 3 pages.
Official Communication for U.S. Appl. No. 14/846,349 dated Jul. 1, 2016, 24 pages.
Official Communication for U.S. Appl. No. 14/981,747 dated Jul. 14, 2016, 29 pages.
Official Communication for U.S. Appl. No. 14/869,721 dated Aug. 3, 2016, 5 pages.
Official Communication for U.S. Appl. No. 13/452,628 dated Aug. 18, 2016, 22 pages.
Official Communication for U.S. Appl. No. 14/180,308 dated Feb. 8, 2017, 3 pages.
Official Communication for U.S. Appl. No. 14/346,349 dated Mar. 1, 2017, 27 pages.
Official Communication for U.S. Appl. No. 13/935,147 dated Mar. 7, 2017, 12 pages.
Official Communication for U.S. Appl. No. 13/365,150 dated Mar. 15, 2017, 19 pages.
Official Communication for U.S. Appl. No. 13/452,628 dated Mar. 9, 2017, 24 pages.
Official Communication for U.S. Appl. No. 15/379,267 dated Mar. 10, 2017, 11 pages.
Official Communication for U.S. Appl. No. 13/415,797 dated Apr. 14, 2017, 3 pages.
Official Communication for U.S. Appl. No. 13/837,815 dated Nov. 9, 2016, 11 pages.
Official Communication for U.S. Appl. No. 15/260,221 dated Dec. 20, 2016, 21 pages.
Official Communication for U.S. Appl. No. 15/271,013 dated Dec. 15, 2016, 50 pages.
Official Communication for U.S. Appl. No. 13/415,797 dated Jan. 11, 2017, 25 pages.
Official Communication for U.S. Appl. No. 13/675,837 dated Jan. 11, 2017, 29 pages.
Efficient frontier—Wikipedia, Efficient frontier, Wikipedia webpages, Oct. 30, 2016, https://en.wikipedia.org/wiki/Efficient_frontier, 2 pages.
Official Communication for U.S. Appl. No. 13/917,503 dated Jan. 12, 2017, 27 pages.
Official Communication for U.S. Appl. No. 14/033,130 dated Jan. 11, 2017, 12 pages.
Official Communication for U.S. Appl. No. 14/977,368 dated Oct. 19, 2016, 5 pages.
Official Communication for U.S. Appl. No. 15/351,313 dated Jan. 12, 2017, 7 pages.
Official Communication for U.S. Appl. No. 13/365,150 dated Oct. 24, 2016, 19 pages.
Official Communication for U.S. Appl. No. 14/180,303 dated Oct. 19, 2016, 22 pages.
Official Communication for U.S. Appl. No. 15/351,313 dated Jul. 18, 2017, 15 pages.
Official Communication for U.S. Appl. No. 15/260,221 dated Aug. 15, 2017, 21 pages.
Official Communication for U.S. Appl. No. 13/365,150 dated Aug. 23, 2017, 30 pages.
Official Communication for U.S. Appl. No. 13/365,150 dated May 22, 2017, 3 pages.
Official Communication for U.S. Appl. No. 13/917,503 dated May 16, 2017, 29 pages.
Official Communication for U.S. Appl. No. 14/869,721 dated May 5, 2017, 49 pages.
Official Communication for U.S. Appl. No. 14/981,747 dated May 19, 2017, 43 pages.

(56) References Cited

OTHER PUBLICATIONS

Official Communication for U.S. Appl. No. 15/271,013 dated May 24, 2017, 37 pages.
Official Communication for U.S. Appl. No. 14/180,308 dated May 25, 2017, 21 pages.
Official Communication for U.S. Appl. No. 15/379,267 dated Jun. 30, 2017, 16 pages.
Official Communication for U.S. Appl. No. 13/837,815 dated Jun. 12, 2017, 12 pages.
Official Communication for U.S. Appl. No. 14/033,130 dated Jun. 29, 2017, 18 pages.
Official Communication for European Application No. 13151967.0 dated Aug. 18, 2017, 7 pages.
European Search Report for European Application No. 10775648.8 dated Mar. 10, 2017, 6 pages.
Official Communication for European Application No. 12755613.2 dated Aug. 17, 2017, 7 pages.
Official Communication for U.S. Appl. No. 14/033,130 dated Sep. 7, 2017, 3 pages.
Official Communication for U.S. Appl. No. 14/846,349 dated Sep. 8, 2017, 25 pages.
Official Communication for U.S. Appl. No. 13/452,628 dated Sep. 28, 2017, 26 pages.
Official Communication for U.S. Appl. No. 13;837,815 dated Sep. 28, 2017, 9 pages.
Official Communication for U.S. Appl. No. 13/415,797 dated Sep. 7, 2017, 26 pages.
Official Communication for U.S. Appl. No. 14/869,721 dated Oct. 17, 2017, 30 pages.
Official Communication for U.S. Appl. No. 15/379,267 dated Oct. 6, 2017, 3 pages.
Official Communication for U.S. Appl. No. 13/935,147 dated Nov. 3, 2017, 11 pages.
Official Communication for U.S. Appl. No. 14/846,349 dated Nov. 20, 2017, 3 pages.
Official Communication for U.S. Appl. No. 14/869,721 dated Jan. 19, 2018, 3 pages.
Official Communication for U.S. Appl. No. 14/981,747 dated Dec. 12, 2017, 44 pages.
Official Communication for U.S. Appl. No. 14/033,130 dated Dec. 20, 2017, 12 pages.
Official Communication for U.S. Appl. No. 14/180,308 dated Dec. 22, 2017, 18 pages.
Official Communication for U.S. Appl. No. 15/271,013 dated Dec. 27, 2017, 35 pages.
Official Communication for U.S. Appl. No. 15/260,221 dated Jan. 9, 2018, 21 pages.
Official Communication for U.S. Appl. No. 15/379,267 dated Jan. 2, 2018, 15 pages.
Official Communication for U.S. Appl. No. 15/351,313 dated Jan. 8, 2018, 11 pages.
Official Communication for U.S. Appl. No. 14/846,349 dated Jan. 18, 2018, 29 pages.
Official Communication for U.S. Appl. No. 13/935,147 dated Jan. 17, 2018, 3 pages.
Official Communication for U.S. Appl. No. 13/837,815 dated Jan. 26, 2018, 12 pages.
Official Communication for U.S. Appl. No. 15/859,008 dated Mar. 5, 2018, 20 pages.
Official Communication for U.S. Appl. No. 13/917,503 dated Nov. 28, 2017, 26 pages.
Official Communication for U.S. Appl. No. 13/917,503 dated May 10, 2018, pp. 1-38.
Official Communication for U.S. Appl. No. 13/837,815 dated Apr. 5, 2018, pp. 1-4.
Official Communication for U.S. Appl. No. 14/869,721 dated May 11, 2018, pp. 1-33.
Official Communication for U.S. Appl. No. 15/351,313 dated Jun. 4, 2018, pp. 1-9.
Official Communication for U.S. Appl. No. 15/858,945 dated Apr. 4, 2018, pp. 1-74.
Official Communication for U.S. Appl. No. 15/859,058 dated May 14, 2018, pp. 1-76.
Official Communication for U.S. Appl. No. 13/935,147 dated Apr. 5, 2018, pp. 1-14.
Official Communication for U.S. Appl. No. 13/917,503 dated Jul. 19, 2018, pp. 1-3.
Official Communication for U.S. Appl. No. 14/846,349 dated Jul. 20, 2018, pp. 1-40.
Official Communication for U.S. Appl. No. 14/981,747 dated Jul. 5, 2018, pp. 1-62.
Official Communication for U.S. Appl. No. 15/271,013 dated Jul. 6, 2018, pp. 1-49.
Official Communication for U.S. Appl. No. 15/379,267 dated Jul. 19, 2018, pp. 1-34.
Official Communication for U.S. Appl. No. 13/935,147 dated Aug. 10, 2018, pp. 1-25.
Official Communication for U.S. Appl. No. 14/033,130 dated Aug. 9, 2018, pp. 1-47.
Official Communication for U.S. Appl. No. 15/858,945 dated Sep. 10, 2018, pp. 1-25.
Official Communication for U.S. Appl. No. 15/859,008 dated Jul. 31, 2018, pp. 1-28.
Official Communication for U.S. Appl. No. 14/180,308 dated Aug. 6, 2018, pp. 1-23.
Official Communication for U.S. Appl. No. 13/452,628 dated Nov. 18, 2013.
Official Communication for U.S. Appl. No. 14/033,130 dated Dec. 16, 2013.
Official Communication for U.S. Appl. No. 13/324,253 dated Jan. 23, 2014.
Official Communication for U.S. Appl. No. 13/675,837 dated Jan. 31, 2014.
Official Communication for U.S. Appl. No. 13/917,503 dated Jan. 31, 2014.
Robinson Glen, Cloud Economics—Cost Optimization (selected slides). Amazon Web Services AWS, Slideshare, Feb. 28, 2012 http://www.slideshare.net/AmazonWebServices/whats-new-with-aws-london.
Skilton et al, Building Return on Investment from Cloud Computing, The open Group Whitepaper, mladina webpages. Apr. 2010 http://www.mladina.si/media/objave/dokumenti/2010/5/31/31_5_2010_open_group_building_return-on-investment-from-cloud-computing.pdf.
Ward Miles, Optimizing for Cost in the Cloud (selection). AWS Summit, Slideshare Apr. 2012 http://www.slideshare.net/AmazonWebServices/optimizing-your-infrastructure-costs-on-aws.
Amazon Reserved Instances, Amazon Web Services, archives org, Jan. 14, 2013 http://web.archive.org/web/2012011453849/http://aws.amazon.com/rds/reserved-instances/?
Cost Optimisation with Amazon Web Services, extracted slides. Slideshare Jan. 30, 2012 http://www.slideshare.net/AmazonWebServices/cost-optimisation-with-amazon-web-services?from_search=1.
Deciding an Approach to the cloud AWS Reserved Instances, Cloudyn webpages, Feb. 28, 2012 https://www.cloudyn.com/blog/deciding-an-approach-to-the-cloud-aws-reserved-aws.
Ganesan Harish. Auto Scaling using AWS. Amazon Web Services AWS (selected slides), Apr. 20, 2011 http://www.slideshare.net/harishganesan/auto-scaling-using-amazon-web-services-aws.
Office Communication for U.S. Appl. No. 13/415,797 dated Apr. 9, 2014.
Office Communication for U.S. Appl. No. 13/324,253 dated Apr. 9, 2014.
Office Communication for U.S. Appl. No. 13/324,253 dated Oct. 24, 2014.
Office Communication for U.S. Appl. No. 13/365,150 dated Dec. 3, 2014.
Office Communication for U.S. Appl. No. 13/452,628 dated Oct. 1, 2014.
Office Communication for U.S. Appl. No. 13/837,815 dated Apr. 7, 2014.

(56) References Cited

OTHER PUBLICATIONS

Office Communication for U.S. Appl. No. 13/675,837 dated Jan. 31, 2014.
Office Communication for U.S. Appl. No. 13/675,837 dated Apr. 2, 2014.
Office Communication for U.S. Appl. No. 13/917,503 dated Apr. 3, 2014.
Office Communication for U.S. Appl. No. 13/935,147 dated Apr. 11, 2014.
Office Communication for U.S. Appl. No. 13/935,147 dated Jun. 16, 2014.
Office Communication for U.S. Appl. No. 14/033,130 dated May 27, 2014.
Office Communication for U.S. Appl. No. 14/033,130 dated Aug. 5, 2014.
Office Communication for U.S. Appl. No. 14/180,308 dated Jan. 30, 2015.
Office Communication for U.S. Appl. No. 14/180,308 dated Apr. 8, 2014.
Office Communication for U.S. Appl. No. 13/452,628 dated Mar. 13, 2014.
SAS Activity-Based Management, 2010, Fact Sheet, 4 pages.
Office Communication for U.S. Appl. No. 14/180,308 dated Sep. 2, 2014.
Office Communication for U.S. Appl. No. 14/180,308 dated Apr. 17, 2015.
Extended European Search Report in EP Application No. 14159413.5 dated Jul. 4, 2014.
Office Communication for U.S. Appl. No. 13/415,797 dated Jan. 12, 2015.
Office Communication for U.S. Appl. No. 13/837,815 dated Sep. 25, 2014.
Office Communication for U.S. Appl. No. 13/324,253 dated Feb. 19, 2015.
Henriet et al. "Traffic-Based Cost Allocation in a Network." The Rand Journal of Economics, 1996, pp. 332-345.
Rudnick et al., "Marginal Pricing and Supplement Cost Allocation in Transmission Open Access." Power Systems, IEEE Transactions on 10.2, 1995, pp. 1125-1132.
Office Communication for U.S. Appl. No. 13/949,019 dated Feb. 10, 2015.
European Search Report for Application No. 12755613.2 dated Jan. 26, 2015.
Office Communication for U.S. Appl. No. 13/452,628 dated Mar. 30, 2015.
Office Communication for U.S. Appl. No. 13/917,503 dated Apr. 16, 2015.
Office Communication for U.S. Appl. No. 13/675,837 dated Apr. 16, 2015.
Office Communication for U.S. Appl. No. 13/837,815 dated Apr. 27, 2015.
Office Communication for U.S. Appl. No. 13/452,628 dated Jun. 23, 2015.
Office Communication for U.S. Appl. No. 13/415,797 dated Jul. 23, 2015.
International Search Report and Written Opinion for PCT/US2015/015486 dated Jun. 29, 2015.
Office Communication for U.S. Appl. No. 13/935,147 dated Jul. 9, 2015.
Official Communication for U.S. Appl. No. 13/415,797 dated Oct. 19, 2015.
Official Communication for U.S. Appl. No. 13/837,815 dated Sep. 28, 2015.

\* cited by examiner

*500*

| GL Actuals.ID | Cost |
|---|---|
| 301, Payroll (IT OPERATIONS) | $237,000 |
| 330, Employee Benefits (IT OPERATIONs) | $49,000 |
| 320, Payroll Taxes (IT OPERATIONS) | $4,100 |
| 760, Repairs (IT OPERATIONS) | $18,000 |
| 759, Rent Equipment (IT OPERATIONS) | $18,000 |
| 711, Fees and Consulting (IT OPERATIONS) | $7,600 |
| 650, Training (IT OPERATIONS) | $6,200 |
| 777, Miscellaneous Expense | $1,800 |

*FIG. 5*

INTERMEDIATE RESOURCE ALLOCATION TRACKING IN DATA MODELS

TECHNICAL FIELD

The present invention relates generally to computer automated activity based budget modeling, forecasting and cost accounting, and more particularly, but not exclusively to improving performance of generating reports.

BACKGROUND

Businesses that strive to remain viable and successful in today's competitive commercial environment are required to adopt accurate and responsive budgeting practices. To improve efficiency, businesses use financial models that apply modern budgeting, forecasting and cost accounting techniques. For some accounting techniques, the complexity of the financial allocation model may increase as the number of tracked activities and elements increases. Therefore, for larger enterprises, sophisticated computer programs and computers are often required to assist in generating useful and relevant budgets based on financial allocation models.

In some cases, the large number of items and entities required for financial modeling can make development of modeling applications difficult. Historically, the size and complexity of these financial allocation models have made it difficult to accurately ascertain a total cost of ownership for an offering such as a product and/or service. Further, the size and complexity of modern financial allocation models can make it difficult to generate reporting information based on the model. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the present invention, reference will be made to the following Description of the Various Embodiments, which is to be read in association with the accompanying drawings, wherein:

FIG. 5 shows a table that may include information related to datasets that may be used by a cost modeling platform server computer for generating business systems and data models.

DESCRIPTION OF THE VARIOUS EMBODIMENTS

Figure 1:
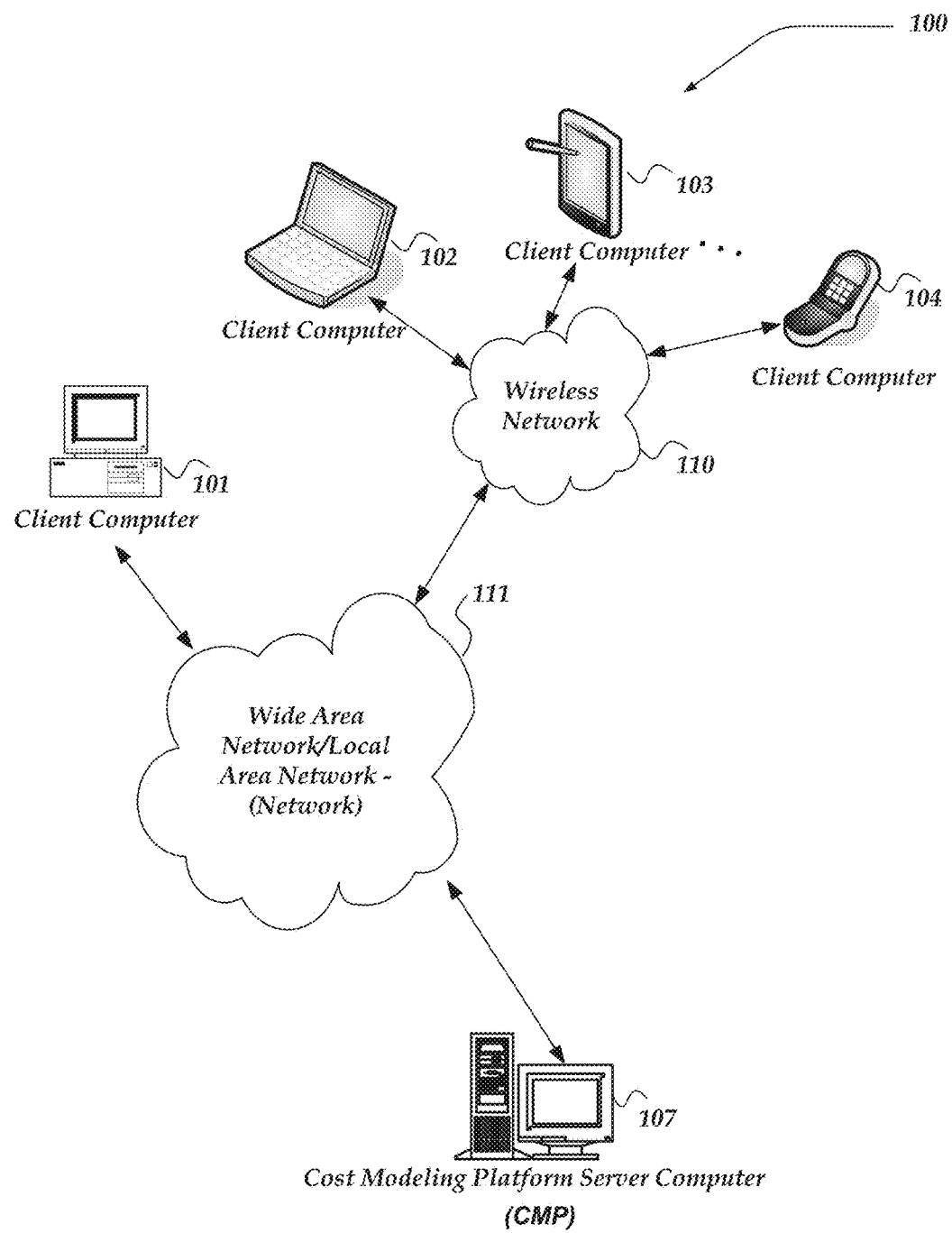
FIG. 1 illustrates a system diagram showing components of an environment in which at least one of the various embodiments may be practiced.

The present innovations now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "Financial allocation model," "data model", and "cost model" refers to a graph based representation of a system of resource allocation rules and/or financial allocation rules that may be used for costing actual expenditures (for management accounting), budgeting future expenditures, or modeling any type of quantitative resource (e.g., energy, power consumption, money, utilities, or the like). Nodes in the model may represent classes of items that may be associated with costs, expenses, resource generation, resource consumption, or the like. The edges of the graph may represent how the resources, such as, costs and/or expenses may be allocated between the nodes. A data model may be represented using a visual rendering of a graph showing the nodes and the edges connecting the nodes.

As used herein, the terms "cost line item," or "line item" refer to a single line item in a data model and/or a budget (or finance allocation model) and its associated cost/expense in terms of resources. For example, the costs associated with a particular computer that is an email server may be a single item having a particular cost (e.g., the email server may correspond to a cost line item).

As used herein, the terms "category," or "data object" refer to a set and/or class of cost line items that may be grouped together. Also, dataset information in fields of a dataset template may be mapped to one or more categories in a category template. For example, a collection of computers performing services such as email, web serving, enterprise resource planning, may represent separate cost line items and they may be grouped into the Servers category and/or data object.

As used herein, the terms "allocation rules," "entity propagation rules," or "propagation rules" refer to rules in the financial data model that determine how the costs/expenses (e.g., resources) from a category are apportioned between/among other categories. Also, such rules may be assigned to individual cost line items. For example, if an email server cost line item has a value of $1000, an allocation or entity propagation rule may be defined such that 50% of the expense may be allocated to the Marketing department and 50% may be allocated to the Engineering department. Also, allocation rules may be applied at the category as well as the cost line item level.

As used herein, the term "assignment ratios," refers to the distribution ratio of resources, such as, costs that are allocated from a source object in a data model to a target object in the data model. The assignment ratios describe how resources flow from cost line items in the source object to cost line items in the target object. For example, if a model has a Server object allocating $1000 to a Department object, the assignment ratios describe how the $1000 is allocated from the cost line items (particular servers) in the Server object to the cost line items in the Department object (particular departments). Accordingly, for example, if the Servers object (the source object) includes a cost line item for an Email Server that allocates $800 to the Engineering Department and $200 to the Marketing Department, the assignment ratio for Email Server to Engineering Department may be 0.8 ($800/$1000) and the assignment ratio for Email Server to Marketing Department may by 0.2 ($200/$1000). Assignment ratios may be explicitly defined by allocation rules. Or they may be derived based on the amount resources/costs that may be allocated from the source object cost line items to the target object cost line items.

As used herein, the terms "business system" and/or "generated business system," refers to a system that has been generated using the cost modeling application. Various embodiments disclosed herein may be related to financial applications. But, one of ordinary skill in the art will appreciate that generated business systems are not limited to financial applications.

As used herein, the term "external data source" refers to any separately located system that may enable and/or provide access to one or more datasets of information.

As used herein, the term "dataset" refers to a collection of data, usually presented in tabular form. Each column may represent a particular variable. Each row may represent a given member of the dataset. Also, it may list values for fields for each of the variables, such as name, location, cost, owner, manufacturer, serial number, or the like. Non-tabular datasets can also take the form of marked up strings of characters, such as an XML file.

As used herein, the term "total cost value" refers to a value that is determined for providing at least one offering. A model for determining the total cost value (in terms of resources) of at least one offering is based at least on an allocation of cost data to at least one category in a category template in a cost model.

As used herein, the terms "source object," or "source data object" refer to an object in a data model that may be providing resource values (e.g., costs/expenses) that may be allocated to one or more other objects (target objects). In at least one of the various embodiments, source objects may be used to represent one or more categories in a data model.

As used herein, the terms "target object," or "target data object" refer to an object in a data model that may be allocated resource values (e.g., costs/expenses) from one or more other objects (source objects). In at least one of the various embodiments, target objects may be used to represent one or more categories in a data model.

As used herein, the term "aspect object" refers to an object in a data model that is used for tracking/tracing how resources may be associated with an aspect of the one or more of data objects in a model. Aspect objects may have their own allocation rules and assignment ratio tables that describe how the resources may be associated with line items of the aspect object. Aspect object may be used to model interesting relationships in the model without obscuring important information for other objects.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards intermediate resource allocation tracking in data models. In at least one of the various embodiments, resources may be allocated resources for data objects in a business system using one or more network computers.

In at least one of the various embodiments, a data model that includes the data objects may be traversed, such that a traversal path through the data model follows one or more allocation rules that are included in the data model. In at least one of the various embodiments, the traversal path through the data model may be generated based on a report query that includes at least a source data object and a target data object. In at least one of the various embodiments, the data model may be a financial allocation model that includes, two or more data objects and one or more aspect objects, with the two or more data objects representing categories of cost line items in the financial allocation model.

In at least one of the various embodiments, if an aspect object may be encountered during the traversal, resources from one or more line items of a source data object may be associated with one or more line items of the aspect object based on the traversal path. The resources that may be associated with the line items of the aspect object may be also available for allocation to one or more other data objects in the data model.

In at least one of the various embodiments, if a data object, rather than an aspect object, may be encountered during the traversal, resources from one or more line items of a source data object may be allocated to one or more line items of the data object based on another of the one or more allocation rules, such that, the resources that may be allocated to the one or more line items of the data object may be unavailable for allocation to the one or more other data objects in the data model.

In at least one of the various embodiments, the one or more line items of the aspect object may be provided by one or more datasets that may be associated with a business system that may be being modeled by the data model.

In at least one of the various embodiments, one or more assignment ratio tables may be generated based on the association of resources from the one or more line items of the source data object with the one or more line items of the aspect object.

In at least one of the various embodiments, in response to receiving a query that includes a reference to one or more aspect objects, the traversal path may be modified to require each of the one or more aspect objects to be included in the traversal path and report information may be generated based on at least the source data object, and the one or more aspect objects.

Illustrated Operating Environment

FIG. 1 shows components of one embodiment of an environment in which at least one of the various embodiments may be practiced. Not all of the components may be required to practice various embodiments, and variations in the arrangement and type of the components may be made. As shown, system 100 of FIG. 1 includes local area networks ("LANs")/wide area networks ("WANs")–(network) 111, wireless network 110, client computer 101-104, and Cost Modeling Platform Server (CMP) 107.

Generally, client computers 102-104 may include virtually any portable computing device capable of receiving and sending a message over a network, such as network 111, wireless network 110, or the like. Client computers 102-104 may also be described generally as client computers that are configured to be portable. Thus, client computers 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. As such, client computers 102-104 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client computer 101 may include virtually any computing device capable of communicating over a network to send and receive information, including messaging, performing various online actions, or the like. The set of such devices may include devices that typically connect using a wired or wireless communications medium such as personal computers, tablet computers, multiprocessor systems, microprocessor-based or programmable consumer electronics, network Personal Computers (PCs), or the like. In at least one of the various embodiments, at least some of client computers 102-104 may operate over wired and/or wireless network. Today, many of these devices include a capability to access and/or otherwise communicate over a network such as network 111 and/or wireless network 110. Moreover, client computers 102-104 may access various computing applications, including a browser, or other web-based application.

In at least one of the various embodiments, one or more of client computers 101-104 may be configured to operate within a business or other entity to perform a variety of services for the business or other entity. For example, client computers 101-104 may be configured to operate as a web server, an accounting server, a production server, an email server, video game server, an inventory server, or the like. However, client computers 101-104 are not constrained to these services and may also be employed, for example, as an end-user computing node, in other embodiments. Further, it should be recognized that more or less client computers may be included within a system such as described herein, and embodiments are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In at least one of the various embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In at least one of the various embodiments, a user of the client computer may employ the browser application to perform various actions over a network.

Client computers 101-104 also may include at least one other client application that is configured to receive and/or send data, including budgeting and forecasting information, between another computing device. Client applications may include a capability to provide requests and/or receive data relating to the cost models, budget reports, budget project information, allocation rules, or the like. The client application may provide data representing assignment and/or allocation changes, selecting templates, editing cost allocations between or among categories, generating and/or modifying allocation rules, or the like. In at least one of the various embodiments, client applications may receive and/or generate data related to budgeting and financial models and may generate tables and relationships between and among the data. In at least one of the various embodiments, client computers 101-104 may view and/or modify generated data models.

Wireless network 110 is configured to couple client computers 102-104 and its components with network 111. Wireless network 110 may include any of a variety of wireless sub-networks that may further overlay stand-alone ad-hoc networks, or the like, to provide an infrastructure-oriented connection for client computers 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, 5G, and future access networks may enable wide area coverage for mobile devices, such as client computers 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), High Speed Downlink Packet Access (HSDPA), Long Term Evolution (LTE), or the like. In essence, wireless network 110 may include virtually any wireless communication mechanism by which information may travel between client computers 102-104 and another computing device, network, or the like.

Network 111 is configured to couple network computers with other computing devices, including, CMP 107, client computer(s) 101, and through wireless network 110 to client computers 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, processor-readable storage devices described in more detail below.

Figure 3:
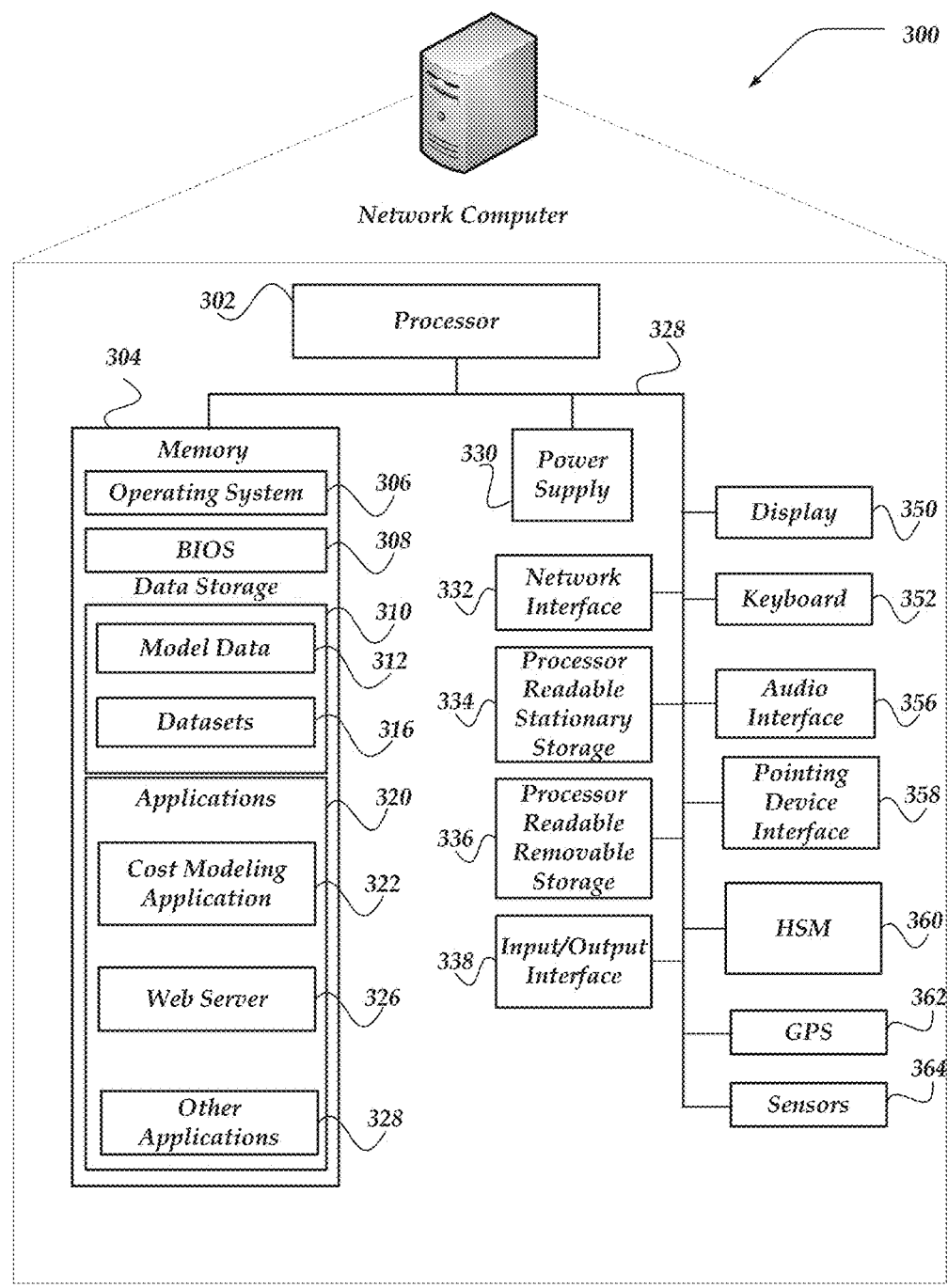
FIG. 3 illustrates one embodiment of a network computer that may be included in a system.

CMP 107 may include virtually any network computer usable to perform data processing operation that may be used for generating cost models, data models, allocation rules, cost allocations, total cost values for offerings, displays and/or reports thereof, such as network computer 300 of FIG. 3. In at least one of the various embodiments, CMP 107 employs various techniques to create, define, generate, and/or automated data processing applications such as budgeting and financial management applications and one or more cost models and/or data models. CMP 107 may include modules for generating data processing applications that may apply models that may include dataset templates, category templates, allocation rules, or the like. Furthermore, CMP 107 may include and/or generate data processing applications for visualizing the generated allocation categories, cost allocations, budgets, cost models, data models, allocation rules, total cost values for offerings, or the like.

Devices that may operate as CMP 107 include various network computers, including, but not limited to personal computers, desktop computers, multiprocessor systems, microprocessor-based or programmable consumer electronics, network PCs, server devices, tablet computers, network appliances, or the like. It should be noted that while CMP 107 is illustrated as a single network computer, the invention is not so limited. Thus, in another embodiment, CMP 107 may represent a plurality of network computers. For example, in at least one of the various embodiments, CMP 107 may be distributed over a plurality of network computers and/or implemented using cloud architecture.

Moreover, CMP 107 is not limited to a particular configuration. Rather, CMP 107 may operate using a controller/worker approach over a plurality of network computers, within a cluster, a peer-to-peer architecture, cloud-based architecture (e.g., virtual machines), and/or any of a variety of other architectures. Thus, CMP Server Computer 107 is not to be construed as being limited to a single environment, and other configurations, and architectures are also envisaged. CMP Server Computer 107 may employ processes and such as described below in conjunction with FIG. 4 and above to perform at least some of its actions.

Illustrative Client Computer

Figure 2:
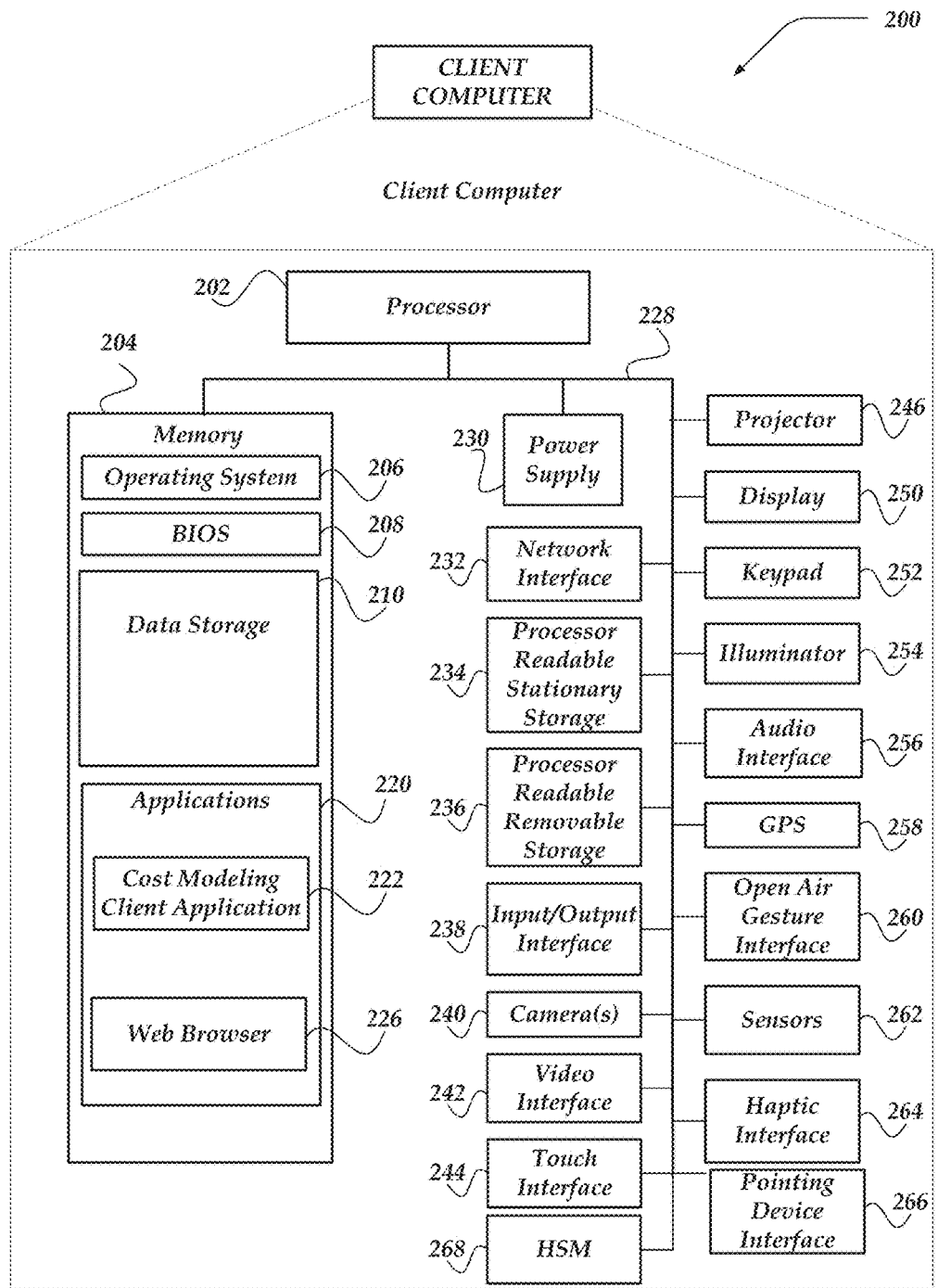
FIG. 2 shows one embodiment of a client computer that may be included in a system.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

In at least one of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect and/or measure data that is external to client computer 200

GPS transceiver 258 can determine the physical coordinates of client computer 200 on the surface of the Earth, which typically outputs a location as latitude and longitude values. GPS transceiver 258 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, cost modeling client application 222. In at least one of the various embodiments, cost modeling client application 222 may be used to exchange communications to and from cost modeling platform server computer 107, including, but not limited to, queries, searches, report information, visualization of models, API calls, or the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

FIG. 3 shows one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of cost modeling platform server computer 107 of FIG. 1.

As shown in the figure, network computer 300 includes a processor 302 in communication with a memory 304 via a bus 328. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect and/or measure data that is external to network computer 300

In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, model data 312, one or more datasets 316, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include cost modeling application 322, web server application 326, other applications 328, or the like, that may perform actions further described below. In at least one of the various embodiments, one or more of the applications may be implemented as modules and/or components of another application. Further, in at least one of the various embodiments, applications may be implemented as operating system extensions, modules, plugins, or the like.

In at least one of the various embodiments, applications, such as, cost modeling application 322, web server application 326, other applications 328, or the like, may be arranged to employ geo-location information to select one or more localization features, such as, time zones, languages, currencies, calendar formatting, or the like. Localization features may be used in user-interfaces and well as internal processes and/or databases. In at least one of the various embodiments, geo-location information used for selecting localization information may be provided by GPS 362. Also, in some embodiments, geolocation information may include information providing using one or more geolocation protocol over the networks, such as, wireless network 108 and/or network 111.

Furthermore, in at least one of the various embodiments, cost modeling application 322 may be operative in a cloud-based computing environment. In at least one of the various embodiments, these applications, and others, that comprise the management platform may be executing within virtual machines and/or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines and/or virtual servers dedicated to cost modeling application 322 may be provisioned and de-commissioned automatically.

Also, in at least one of the various embodiments, cost modeling application 322, or the like, may located in virtual servers running in a cloud-based computing environment rather than being tied to one or more specific physical network computers.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

In at least one of the various embodiments, cost modeling application 322 may enable a user to generate budgets, allocation rules, data models, cost models, total cost values for offerings, reports, or the like. Also in at least one of the various embodiments, cost modeling application 322 may employ processes, or parts of processes, similar to those described below.

Illustrative Logical System Architecture

Figure 4:
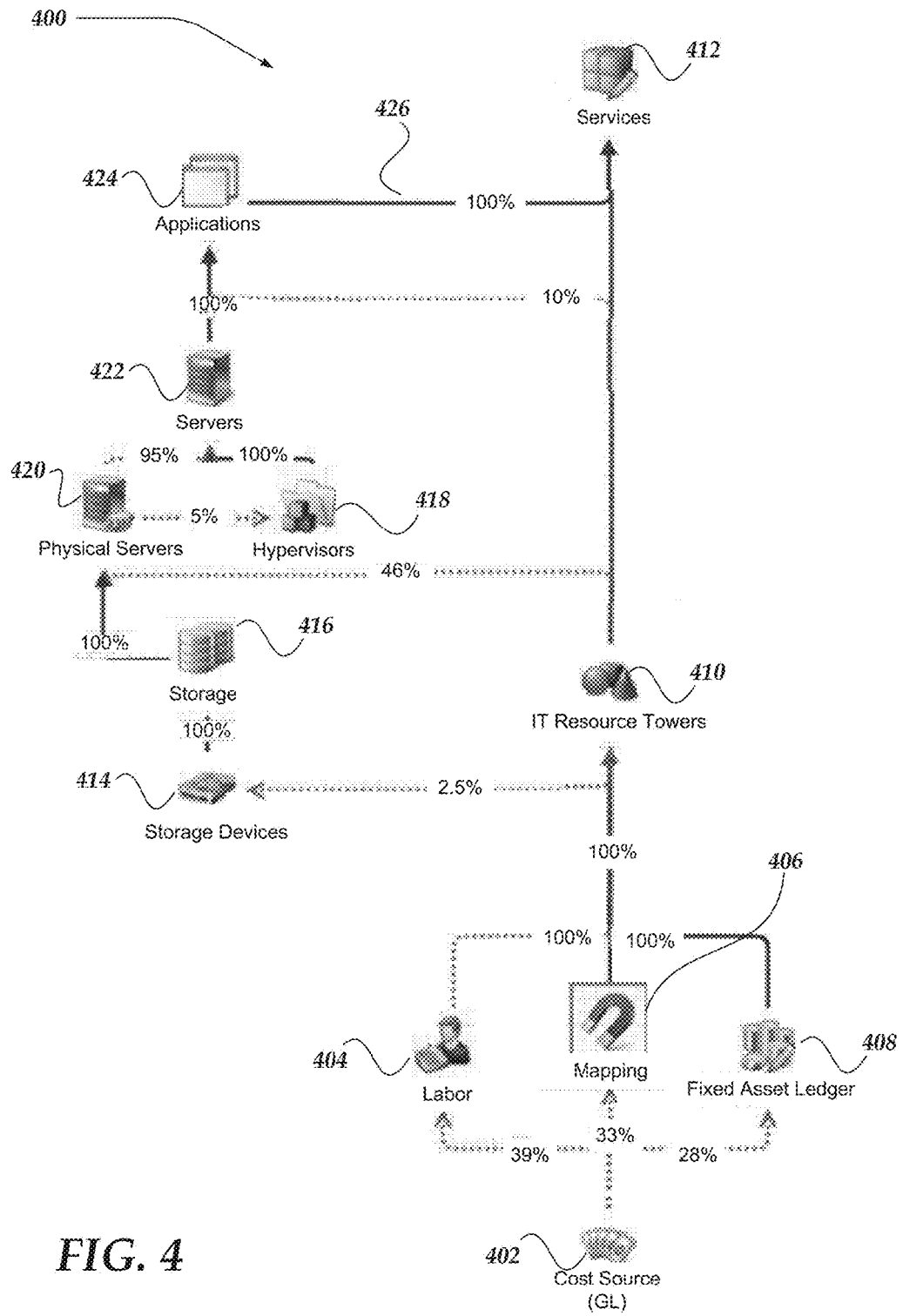
FIG. 4 shows, for at least one of the various embodiments of a data model that may be generated using a cost modeling platform server computer.

FIG. 4 shows, for at least one of the various embodiments model 400 that may be generated using cost modeling platform server computer 107. In at least one of the various embodiments, in this example, model 400 represents a business system and starts with costs flowing from cost source 402, which may be a general ledger (GL) or other type of financial data. In this model, cost source 402 flows to labor 404, fixed asset 408, and to category mapping 406.

In at least one of the various embodiments, in model 400, labor 404 may be allocated 39% of costs, fixed assets 28% of costs, and the remaining 33% may be allocated to a mapping component In at least one of the various embodiments, based on a selected category template, the costs allocated to mapping component 406 may be allocated to the various cost categories that may make up the business system being modeled.

In at least one of the various embodiments, model 400 shows that 100% of costs flow to IT resource tower 410. From IT resource tower 410 costs flow to services 412. Thus, for this business system, model 400 shows that all the costs are allocated to producing the service offerings that the modeled business organization provides.

In at least one of the various embodiments, the cost modeling application may further enable users to gain additional understanding of how the costs from cost source 402 flow through the entire system. Model 400 shows that storage device 414 is responsible for 2.5% for the costs coming from cost source 402. And, that 100% of the costs of storage device 414 flows into the general category of for storage, shown by the allocation trace that shows of 100% of flowing from the storage device 414 to storage component 416. Likewise, model 400 shows that physical servers 420 are burdened by 100% of the costs of storage 416. And, since the business organization modeled by model 400 includes hypervisors that run on physical servers, the costs associate with hypervisor 418 flow from physical server 420. In at least one of the various embodiments, cost for the server category, servers 422 is constituted out of physical servers 420 and hypervisors 418, thus the costs for server 422 flow from those components. Further the applications 424 component of the model may be burdened with 100% of the costs associated with servers 422. Completing the loop, allocation rule 426 shows that service component 412 may be burdened with 100% of the costs associate with applications 424.

FIG. 5 shows table 500 that may include information related to datasets that may be used by cost modeling platform server computer 107 for generating business systems and data models. In at least one of the various embodiments, table 500 shows an example of source cost data in the form of a dataset of General Ledger (GL) accounting records that may be provided by at least one external data source. In at least one of the various embodiments, a dataset may have more or less columns and detail as shown in table 500. In at least one of the various embodiments, dataset information such as shown in table 500 may be provided in various well-known formats and structures. For example, table 500 may be provided as one or more, XML files, comma separated files, directly from database tables, or the like. Also, in at least one of the various embodiments, datasets may be provided in non-standard formats (e.g., proprietary) where custom scripts and applications may be employed to extract and/or parse values from the datasets.

In at least one of the various embodiments, other types of raw datasets may be provided by other external data sources to budget and forecasting platform 107. For example, datasets that include information about physical IT assets, fixed assets, software licenses, employees, labor costs, insurance records, vendor costs, utility costs (electricity, water, sewer, broadband, natural gas, oil, or the like), consulting expenses, legal fees, or the like.

Figure 6:
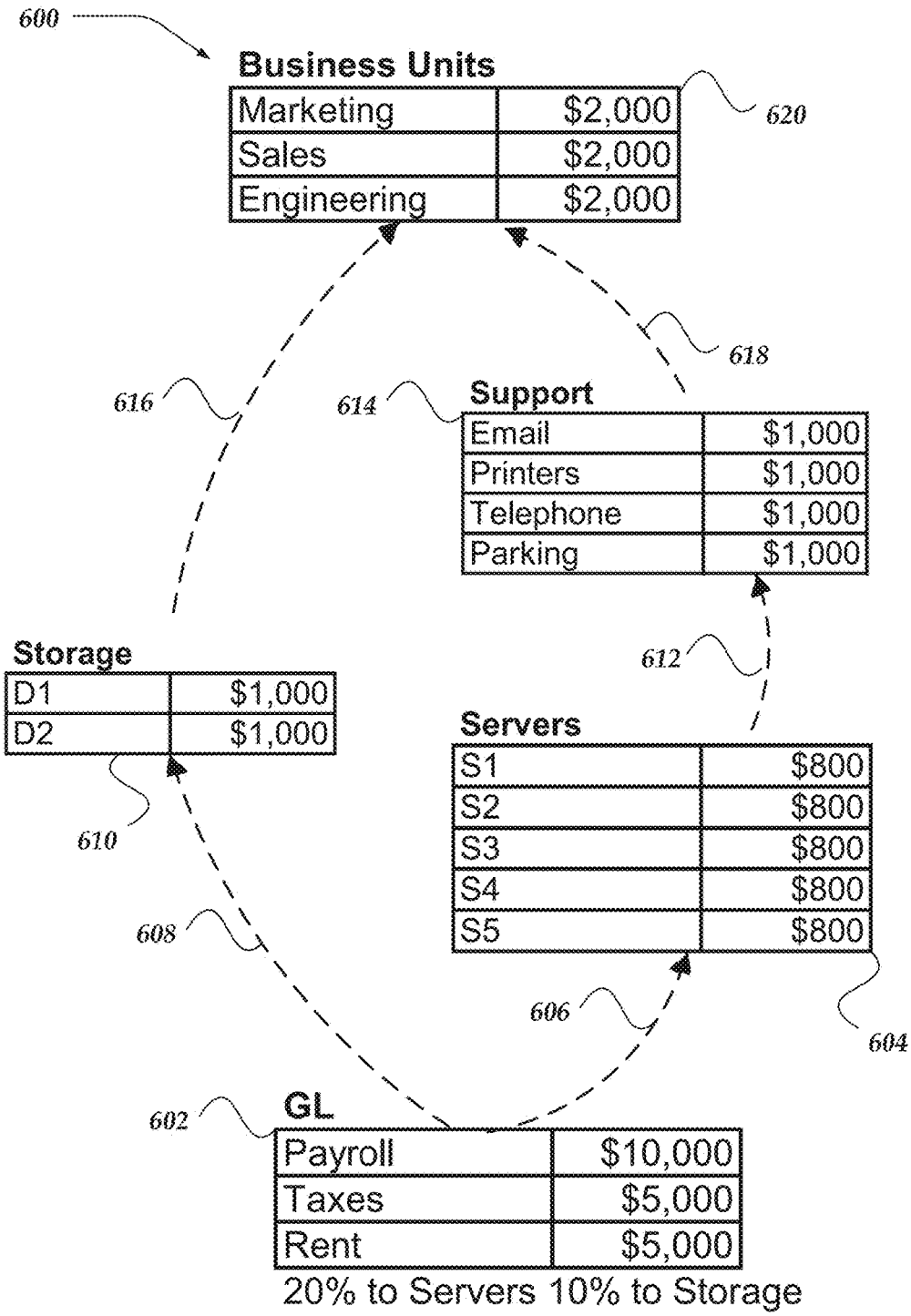
FIG. 6 illustrates a portion of a logical architecture for a data model that may be enabled by at least one of the various embodiments.

FIG. 6 illustrates a portion of a logical architecture for model 600 that may be enabled by at least one of the various embodiments. In at least one of the various embodiments, the model 600 may have five categories/objects: GL 602, Servers 604, Storage 610, Support 612, and Business Units 616. In at least one of the various embodiments, each category contains a set of cost line items. For example, GL 602 includes cost line items for Payroll, Taxes and Rent. Likewise, Support 612 includes cost line items Email, Printers, Telephone, and Parking. In at least one of the various embodiments, each cost line item has one or more associated cost values. For example, Storage 610 has two cost line items, D1, and D2 (e.g., disk drives) having associated cost values of $1000 each.

Allocation rules may be used to connect categories and/or objects of model 600. In at least one of the various embodiments, allocation rules may show how costs (money) flow between the categories. Resulting in a graph where the categories may be represented as nodes and the allocation rules may be represented as edges. In at least one of the various embodiments, generally a model may be represented by a directed acyclic graph but that is not a requirement for an operative model. In at least one of the various embodiments, a model graph may contain cycles that are resolved or estimated using mathematical techniques, including but not limited to Gaussian elimination, Cholesky decomposition or Newton's method.

In at least one of the various embodiments, allocation rule 606 represents a rule allocating 20% of the money in category GL 602 (source object) to Servers category 604 (target object). In this example, GL 602 includes a total of $20,000, thus 20% of $20,000 (e.g., $4,000) flows based on allocation rule 606 to Servers 604. Likewise, allocation rule 608 may allocate $2,000 from GL 602 to Storage 610. The other allocation rules in model 600 allocate 100% of the money to the next category: allocation rule 612 directs 100% of the money (e.g., $4,000) to flow to Support 614; allocation rule 618 directs 100% of the money in Support (e.g., $4,000) to flow to Business Units 620; and allocation rule 616 directs 100% of the money from Storage 610 to flow to Business Units 620.

In at least one of the various embodiments, money that flows into the category may be allocated among the included cost line items. In at least one of the various embodiments, each category may have one or more rules that may describe the assignment ratios for how the money allocated to a category may be assigned to its cost line items. For the categories 604, 610, 614, and 620, allocation rules assign the money allocated to the category evenly among the cost line items comprising each category.

In at least one of the various embodiments, an assignment ratio may represent how the money in an actual budget may be assigned from source category/object cost line items to target category/object cost line items. In at least one of the various embodiments, allocation rules may be applied that distribute the money based on formulas that may be defined by the users or administrators who designed the model. In at least one of the various embodiments, the assignment ratios and allocations may be modified as part of the modeling process.

The model 600 is a simplified model useful for facilitating discussion and understanding of the embodiments, since allocation rules for models of large commercial entities can be numerous and complex. However, model 600 is at least sufficient to enable one of ordinary skill in the art to practice what is claimed herein.

Figure 7:
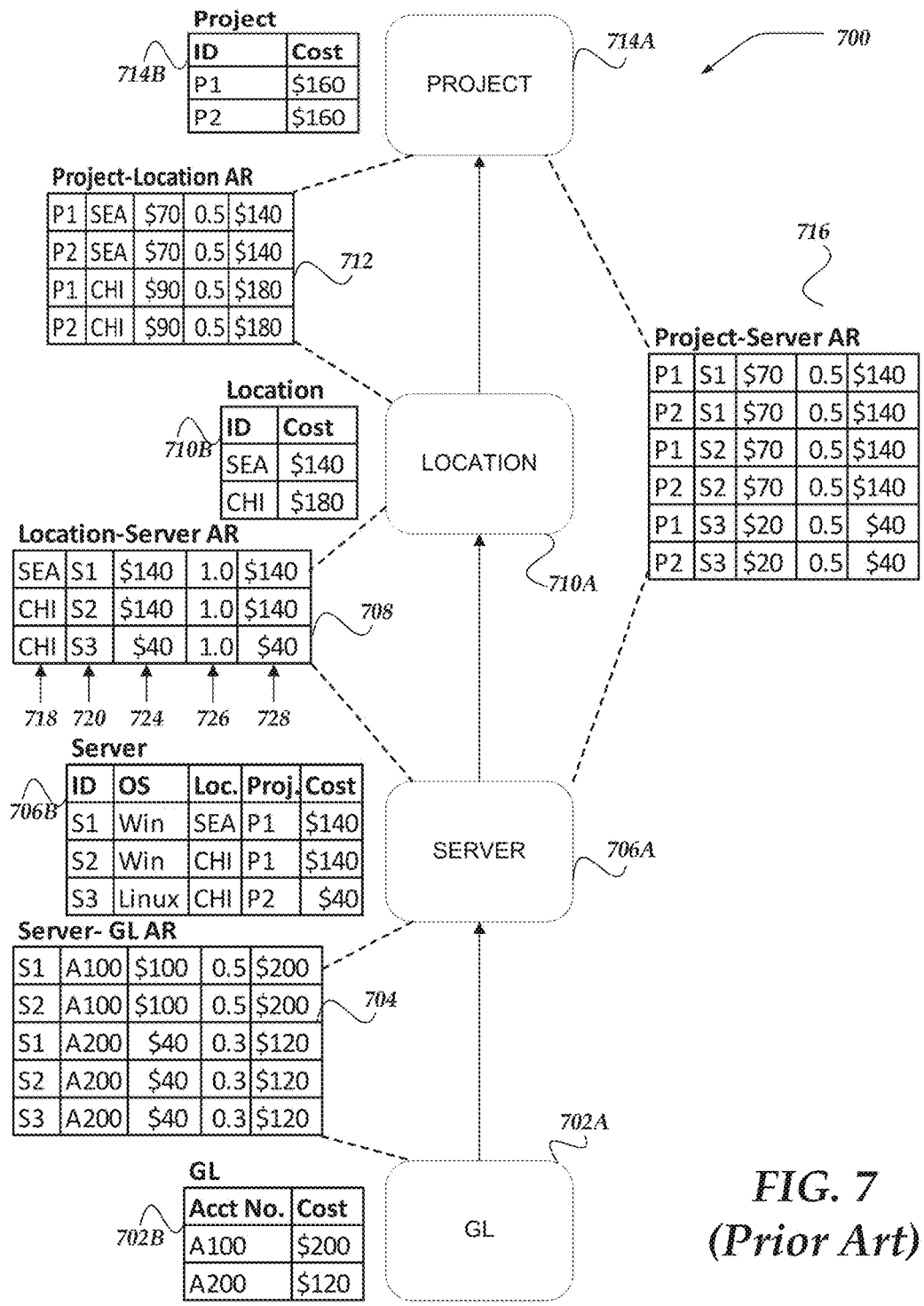
FIG. 7 shows a portion of a data model that represents at least one embodiments of the prior art.

FIG. 7 shows a portion of data model 700 represents at least one embodiments of the prior art. In at least one of the various embodiments, as mentioned above, data models may be arranged to model how costs may be allocated to different objects (e.g., categories) that are part of a business system. (See, FIGS. 4-6 and their accompanying descriptions.) Data model 700 represents a segment of a data model that models the allocation of costs from a cost source, such as, GL object 702A. In this model, GL object 702A allocates costs using allocation rules described by assignment ratio table 704 to server object 706A.

Next, in at least one of the various embodiments, data model 700 shows that the costs may be further allocated, using allocation rule 708 from server object 706A to location object 710A. And, in at least one of the various embodiments, the costs from location object 710A may be allocated as shown by assignment ration table 712 to project object 714A. Note, for this example, project object 714A simply represents the boundary of this model segment. Thus, in at least one of the various embodiments, it may be a terminating node, a business service object, a business unit object, or the like. Note, in this example, each object in model 700 has a corresponding item table that logically represents the cost line items that comprise each object. Accordingly, GL Object 702A may include cost line items as shown in items table 702B; Server object 706A may include cost line items as shown in items table 706B; Location object 708A may include cost line items as shown in items table 708B; and project object 714A may include cost line items as shown in items table 714B. In this example, objects only have a few cost line items, but in production models there may up to thousands or millions of cost line items per object depending on the size of the entity being modeled.

In at least one of the various embodiments, the details of how costs may be allocated from one object in the model to another may be encapsulated in one or more assignment ratio tables that may show how resources flow from one object to another in the mode. In at least one of the various embodiments, in model 700, allocation rules may generate the assignment ratio tables that describe how cost values flow between the modeled objects. Assignment ratio tables 704, 708, 712, and 716 represent the application of the allocation rules in model 700 that define how resources flow from one object to another.

In at least one of the various embodiments, in this example, each assignment ratio table includes columns that may be used to describe how resources (money in this case) flow between the objects in the model. Here, assignment ratio table 708 will be used to explain the different columns shown in the assignment ratio tables used in this example. In this example, each assignment ratio table has the same number of columns, each with the same purpose/definition. One of ordinary skill in the art will appreciate that in other embodiments, the assignment ratio tables may be arranged differently, having more or fewer columns as shown in these examples.

Referring back to assignment ratio table 708, it comprises five columns each containing data related to the cost line items and the allocation rules that participate in the allocation of resources between location object 710A and server object 706A. The first column, column 718 is an ID column for the cost line item that may be allocated resources. The second column, column 720 is an ID column identifying the cost line item that may be providing resources that may be allocated. Column 724 contains the share of resource that may be allocated to the cost line item. Column 726 is the assignment ratio value describing the ratio of source resources to be allocated from one cost line item of an object to another cost line of another object.

Accordingly, assignment ratio (AR) table 708 shows that the location SEA (Seattle) is allocated money from the server S1. For example, S1 may be a server computer that is used by a Seattle Office. Likewise, in this example, AR table 708 shows that server S2 and S3 are providing services to location CHI. Accordingly, costs associated with servers S2 and S3 may be associated with location CHI (Chicago). As discussed above, column 720 shows that $140 is allocated to SEA from server S1; $140 is allocated to CHI from S2; and $40 is allocated to CHI from S3. Also, since column 728 of AR table 708 shows the total costs associated with the line item that the resources are coming from, it shows that 100% of the money from server S1 is allocated to SEA; 100% of the money from server S2 is allocated to CHI; and 100% of the money from server S3 to CHI. Accordingly, in this example, the assignment ratio value in column 726 is 1.0 since the value in column 728 match the values in column 724. In other words, AR table 708 shows that all of the money associated with a given server cost line item (from cost line item table 706B) is allocated to one location line item.

In contrast, a review of AR table 704, shows a different circumstance. AR table 704 shows that the $200 from GL account A100 is split evenly between two servers, S1 and S2, and that the $120 from GL account A200 is split evenly between three servers, S1, S2, and S3. Accordingly, the assignment ratio for GL account A100 is 0.5 since the money is split between two servers. And, the assignment ratio for GL account A200 is 0.333 (1/3) since the money split between three servers.

In at least one of the various embodiments, as mentioned above, the actual allocation of resources between/among cost line items may be defined using allocation rules that define how the resources are allocated. In at least one of the various embodiments, the underlying reasons for employing a particular allocation rule may depend on the objects that are being modeled. For example, in model 700, account A100 is modeled as a line item in GL object 702A/702B and it may represent the cost of operating system software licenses. And, A200, also modeled as a line item in GL object 702A/702B, may represent the cost of electricity. In this example, referring to Server object 706A/706B, it is shown that line items S1 and S2 represent servers using commercial operating systems that are subject to license fees, while line item S3 represents a server using an open source operating system with no license fees. Thus, S1 and S2 are allocated portions of the operating system licensing fee (A100) while S3 is not. However, in this example, all three servers use electricity so the costs from A200 are spread evenly across all three servers. Likewise, in at least one of the various embodiments, the example AR table 708 reflects that in model 700, S1 and S2 are located in Seattle (SEA), and S3 is located in Chicago (CHI). Further, in this example, AR table 712 represents that the costs for project P1 and project P2 are evenly divided between Seattle and Chicago.

In this example, model 700 provides substantial visibility to how resources (money in this case) are allocated throughout the system. As configured, model 700 easily answers questions such as, a report that shows much of the cost of a project is associated with a location. Referring to AR table 712, it is simple to report that $160 of the cost are attributed to P1 and of that $160, $70 comes from SEA. Likewise, it is simple to generate report on how much the costs associated with SEA are from a server. Referring to AR table 708 it is clear that the $140 allocated to SEA comes from the expenses related to server S1. In general, reporting information for adjacent object in the model is efficient and accurate.

However, models, such as, model 700 do not support accurate reporting between model objects that are not adjacent in the model. For example, generating report information about how the money the relationships between line items of Location object 710A to line items of GL object 702A are obscured by the intervening server object 706A. Likewise, location object 710A obscures the cost allocations between project object 714A and Server object 706A, making it difficult to use model 700 to show how costs allocated to projects are contributes by servers.

For example, AR table 716 may be arranged in an attempt to model how the costs associated with projects (project object 714A/714B) may be attributed to servers (server object 706A/706B). But since some information is hidden/blocked by location object 710A/710B, AR table 716 is inaccurate. Here, in this example, tracing from project object 714A/714B to server object 706A/706B AR table 716 may be generated. However, AR table 716 incorrectly indicates that some money from server S1 and server S2 are allocated to project P2 and the some money from S3 is allocated to project P1.

One of ordinary skill in the art will appreciate that allocation rules 704, 708, and 712 are non-limiting examples, and that real-life data models may include arbitrarily complex allocation rules that may include arbitrarily complex formulas for generating assignment ratio tables and mapping costs and/or values between model objects. However, the allocation rules illustrated in herein are sufficient to at least describe, enable, and disclose at least the innovations contained in this application.

Figure 8:
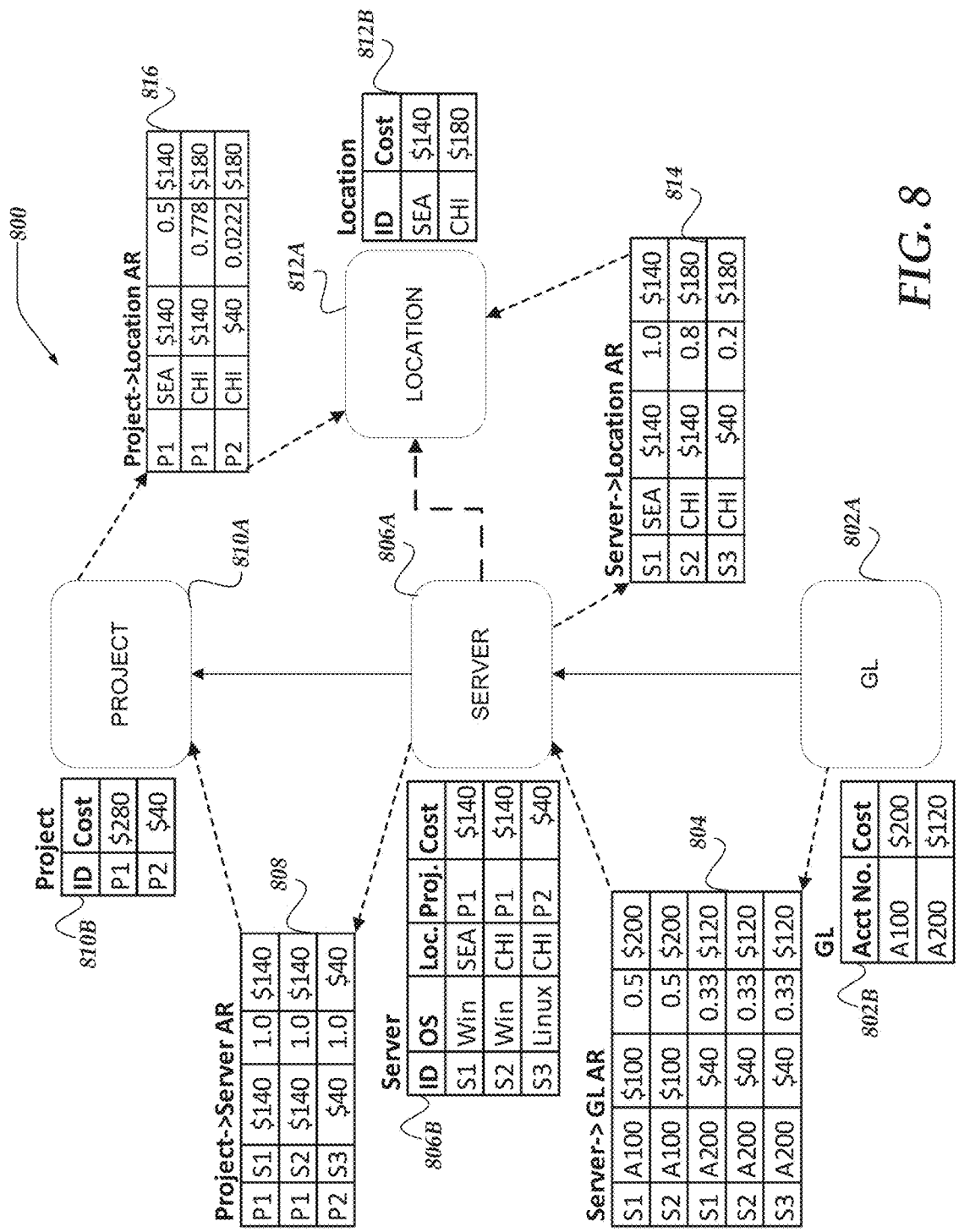
FIG. 8 illustrates a logical architecture of a data model for intermediate resource allocation tracking in data models, in accordance with at least one of the various embodiments.

FIG. 8 illustrates a logical architecture of data model 800 for intermediate resource allocation tracking in data models, in accordance with at least one of the various embodiments. As described above, a model, such as, data model 700 may be arranged to model how costs/money may flow through a business enterprise. However, in some cases, the arrangement of the objects in a model may obscure some details. In some embodiments, users may wish to generate reports and/or other visualizations that include the information that may be obscured and/or unavailable because of the arrangement of the objects in the data model. Accordingly, in at least one of the various embodiments, one or more aspect objects may be added to the model. Aspect objects may be arranged to captured one or more aspects of the business entity that may otherwise be obscured and/or absent from the data model.

In at least one of the various embodiments, aspect objects may be associated with costs from source data objects using dedicated allocation rules that produce AR tables that describe how costs may flow into and out of the aspect object. In particular, the aspect objects AR table may detail how some or all of the costs may associated with other objects in the model. However, since aspect object are used for representing how different aspects are associated with resources, allocating resources to an aspect object does not take away those resources from other objects. For example, model 800 represents how $360 is allocated within a business. Model 800 shows that $320 is allocated from GL object 802A/802B to server object 806A/806B, and ultimately the $320 is allocated to projects object 810A/810B. Note, that the money assigned to location object 812A/812B is not subtracted from the money that flows through the rest of model 800. This is because location object 812A/812B is an aspect object not a data object. It is used to describe how various aspects (in this case, locations of the servers) are associated with resources. Accordingly, model 800 can express how much money allocated with a project and/or server is associated with a particular location.

Accordingly, in at least one of the various embodiments, data models, such as, data model 800 may be generated. In this example, data model 800 is similar to data model 700 in that is models GL object 802A/802B, server object 806A/806B, project object 810A/810B, and location object (812A/812B). However, in data model 800, location object 812A/812B is an aspect object rather than a data object.

In this example, model 800 includes AR table 804 that describes resource relationships (money allocation) between GL object 802A/802B and server object 806A/806B. And, in this example, model 800 includes AR table 808 that describes resource relationships (money allocation) between server object 806A/806B and project object 810A/810B. This is similar to model 700 described above. However, in model 800 the location of the servers is not part of the main model.

In at least one of the various embodiments, aspect objects may be included in data models to track how resource/money may be associated with various aspects of the modeled entity without obscuring important details of the other relationships in the models. In this example, model 800 enables accurate report information to be generated regarding how money is allocated from servers to projects. Model 800 enables a user to obtain accurate answers to questions that could not be provided from model 700, such as: how much money from server S3 is allocated to P1? Answer: $0. This information was obscured in model 700 because of the intervening location object (location object 710A/710B). In model 800, location object 812A/812B is an aspect object that is positioned such that it does not obscure how resource flows between server object 816A/806B and project object 810A/810B.

In at least one of the various embodiments, allocation rules may be generated to describe how resources flow resources to and from aspect objects. These rules may be used by cost modeling application 322 to generate AR tables that may be used for generating reporting information that describes the resources that are associated to the aspect objects. For example, model 800 includes AR table 814 that describes how servers are associated with locations, and AR table 816 that describes how projects are associated with locations. Accordingly, in this example, by arranging model 800 to include the aspect object, location object 812A/812B, model 800 may be used to report how the server object's resources (money) are associated with different locations using AR table 814. Likewise, in this example, by arranging model 800 to include the aspect object, location object 812A/812B, model 800 may be used to report how the project object's resources (money) are associated with different locations using AR table 816. In other words, aspect objects allow a user to include report information about one or more aspects of objects in the model. In this example, the location aspect of the servers can be modeled using location object 812A/812B without obscuring other important relationships in the model. Also, though model 800 just includes one aspect object, in practice multiple aspect objects may be included in a model to model various aspects of the relationships in the model. Further, in at least one of the various embodiments, an aspect object may be associated with more than one data object. Accordingly, more than one data object may have resources associated with the same aspect object. For example, in at least one of the various embodiments, if a data model included a Server object and a Storage object, both of these objects may have physical locations, so both could may have money associated with the same Location aspect object.

Generalized Operations

Figure 9:
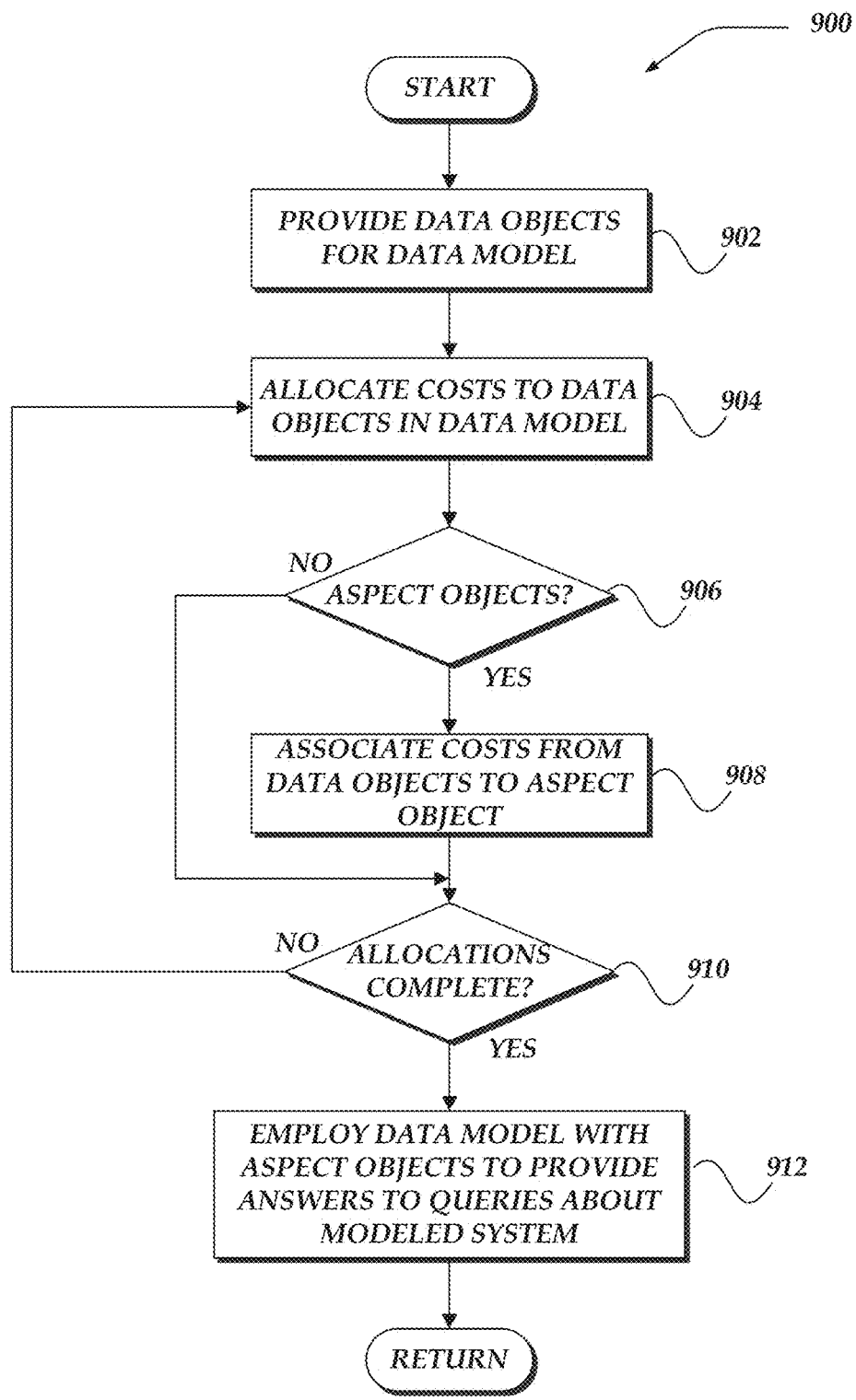
FIG. 9 illustrates a flowchart for a process for intermediate resource allocation tracking in data models in accordance with at least one of the various embodiments.
Figure 10:
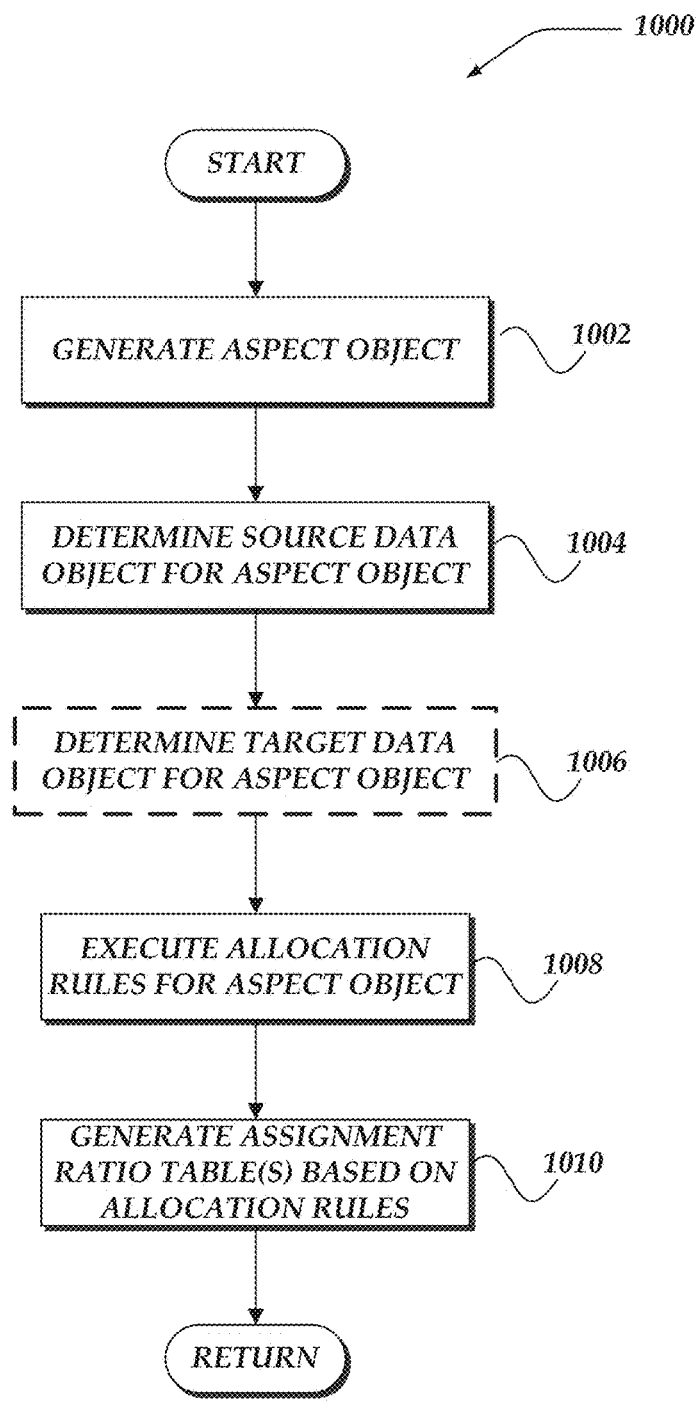
FIG. 10 illustrates a flowchart for a process for including aspect objects in a data model in accordance with at least one of the various embodiments.

FIGS. 9-10 represent the generalized operations for intermediate resource allocation tracking in data models in accordance with at least one of the various embodiments. In at least one of the various embodiments, processes 900, and 1000 described in conjunction with FIGS. 9-10 may be implemented by and/or executed on a single network computer, such as network computer 300 of FIG. 3. In other embodiments, these processes or portions thereof may be implemented by and/or executed on a plurality of network computers, such as network computer 300 of FIG. 3. However, embodiments are not so limited, and various combinations of network computers, client computers, virtual machines, or the like may be utilized. Further, in at least one of the various embodiments, the processes described in conjunction with FIGS. 9-10 may be operative in cost modeling architectures such as those described in conjunction with FIGS. 4-8.

FIG. 9 illustrates a flowchart for process 900 for intermediate resource allocation tracking in data models in accordance with at least one of the various embodiments. After a start block, at block 902, in at least one of the various embodiments, one or more data models objects may be provided for the data model. In at least one of the various embodiments, a cost modeling application, such as, cost modeling application 322, may be arranged to generate data objects that represent categories of items (data object) to be modeled. As described above, examples of categories that may be represented by data objects in models that are modeling the costs/budgets for IT infrastructure, may include, hardware (e.g., servers, desktops, or the like), software costs, labor costs, consulting costs, or the like. Likewise, models representing other types of entities and/or other types of resources may include different types of categories. In some embodiments, models represent the same type of entity, resource, or industry may be different since each entity may arranged the model to meet their specific needs.

At block 904, in at least one of the various embodiments, costs may be allocated to the data objects comprising the data model. In at least one of the various embodiments, a cost modeling application may execute one or more defined allocation rules that define how resources from one data object are allocated to another. In at least one of the various embodiments, allocation rules may be defined to map allocation from cost line items on one data object to cost line items in another data object. In at least one of the various embodiments, execution of allocation rules may result in the generation of corresponding assignment ratio tables that are generated by applying the allocation rules to the data objects.

At decision block 906, in at least one of the various embodiments, if one or more aspect objects are included in the data model, control may flow to block 908; otherwise, in at least one of the various embodiments, control may flow decision block 910. In at least one of the various embodiments, aspect objects may be defined to be part of model based on template, or other configuration information. In some embodiments, a user may configure the data model to include one or more aspect objects. In at least one of the various embodiments, determining if aspect objects may be used in a data model may be based on policy based rules, configuration values, or the like, some of which may comprise a business system template.

At block 908, in at least one of the various embodiments, costs from one or more data objects may be associated with the one or more aspect objects. In at least one of the various embodiments, resources associated with one or more cost line items in the data objects may be mapped to line items of the aspect objects. For example, in FIG. 8, the cost line items in server object 806A/806B are associated with the line items in location object 812A/812B.

In at least one of the various embodiments, similar to how resources are allocated between data objects, allocation rules may be defined to associate the resources from data objects to aspect objects and vice-versa. Accordingly, in some embodiments, the assignment ratio tables may be generated that describe the details of how the resources are associated between the cost line items of the data objects and the line item of the aspect objects.

In at least one of the various embodiments, associating resources from data object to an aspect object does not consume the associated resources. For example, if $100 is associated from a data object to an aspect object, that $100 remains available to be allocated to other data objects in the data model.

At decision block 910, in at least one of the various embodiments, if the allocations are complete, control may flow to block 912; otherwise, control may loop back to block 904. In at least one of the various embodiments, the modeling process may continue until the model is complete. In at least one of the various embodiments, cost modeling application 322 may be arranged to continue the modeling process until at least all of the resources in the model have been allocated to one or more data objects.

At block 912, in at least one of the various embodiments, since the data model, including zero or more aspect objects may be complete, it may be employed for responding to user queries and generating report information regarding the modelled business/entity. In at least one of the various embodiments, cost modeling applications may be arranged to include report generators that may be used for generating reports based on user input, configuration information, or the like. Reports may include text based reports (e.g., XML files, CSV files, or the like), or visualizations, such as, graphs, charts, Sankey diagrams, heat maps, animations, or the like, or combination thereof. Next, control may be returned to a calling process.

FIG. 10 illustrates a flowchart for process 1000 for including aspect objects in a data model in accordance with at least one of the various embodiments. After a start block, at block 1002, in at least one of the various embodiments, the aspect object may be generated. As described above, in some embodiments, aspect objects may be created based on user input or from configuration information, such as, model template information, or the like, or combination thereof. Similar to data objects, aspect objects may comprise many line items. Also, similar to data objects, the source for the aspect objects line items may be included in one or more datasets that may be associated with the entity that is being modeled. In the example used for FIG. 8, aspect object 812A/812B may be generated from a dataset that include a list of locations that modeled entity has servers.

At block 1004, in at least one of the various embodiments, one or more data objects in the data model may be determined and/or selected to be source data object for one or more aspect objects. For example, in FIG. 8, server object 806A/806B is a source data objects for aspect object (location object) 812A/812B.

At block 1006, in at least one of the various embodiments, option, one or more target data objects may be determined/selected for the aspect object. For example, in FIG. 8, project object 810A/810B is a target data object for aspect object (location object) 812A/812B. This block may be optional since an aspect object may be always be associated with a target data object.

At block 1008, in at least one of the various embodiments, the allocation rules that are associated with the aspect objects and its source/target data objects may be executed. As described above, allocation rules may be defined to describe how resources may be allocated to an aspect object. In at least one of the various embodiments, these rules are similar to the allocation rules used for allocating resources between the data objects in the data model. However, in at least one of the various embodiments, the allocation rules are used to associate resources from cost line items of a data object with line items of an aspect object rather than "allocating" the resources. Accordingly, resources associated with aspect objects are still available to be allocated to data objects.

For example, FIG. 8 shows that $140 is allocated from the S1 cost line item in server object 806A/806B to the SEA aspect line item in location object 812A/812B. And, this example, the same $140 is available to allocate to project object 810A/810B. This is because the allocation of resources to an aspect object simply associates resources the aspect object.

At block 1010, in at least one of the various embodiments, assignment ratio tables for the aspect object may be generated based on the execution of the allocation rules for the aspect object. The allocation ratio tables are data structures that are arranged to track the resource allocations for each line item of the aspect object. The actual data structure and/or data format of an allocation ratio table may vary, but assignment ratio tables may be logically represented in a tabular format where each row corresponds to at least a portion of the resources that are allocated to line item of the aspect object. See, FIG. 8, AR table 814 and AR table 816. Next, control may be returned to a calling process.

It will be understood that each block of the flowchart the illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention. Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

What is claimed as new and desired to be protected by Letters Patent of the United States is:

1. A method for allocating resources for data objects in a business system using a network computer, wherein one or more processors in the network computer are performing actions, comprising:

traversing, by the one or more processors, a data model comprised of nodes and edges that includes the data objects, wherein a traversal path follows one or more allocation rules that are included in the data model, and wherein a data structure for the data model is based on a table data structure for a general ledger dataset that includes a column for general ledger actuals ID and another column for cost for each line item in the table data structure;

employing, by the one or more processors, geolocation information to localize a visual presentation of a user interface that includes one or more of a database or internal processes associated with the data objects in the data model based on a physical location, wherein the localization includes one or more of time zones, languages, currencies, or calendar formatting;

in response to an aspect object encountered during the traversal, the one or more processors retrieve the data model and execute one of the one or more allocation rules to modify the data model by filtering and associating one or more portions of resources from one or more line items of a source data object with one or more line items of the aspect object based on the traversal path that follows the one or more allocation rules, wherein the one or more portions of the resources that are associated with the line items of the aspect object remain available for allocation at the same time to one or more other data objects in the data model; and in response to a data object encountered during the traversal, the one or more processors retrieve the data model and execute another one of the one or more allocation rules to modify the data model by allocating the one or more portions of the resources from the one or more line items of the source data object with one or more line items of the data object based on the other one of the one or more allocation rules, wherein the one or more portions of the resources allocated to the one or more line items of the data object are unavailable for allocation to the one or more other data objects in the data model.

2. The method of claim 1, further comprising, generating one or more assignment ratio tables based on the association of the one or more portions of resources from the one or more line items of the source data object with the one or more line items of the aspect object.

3. The method of claim 1, wherein the one or more line items of the aspect object are provided by one or more datasets that are associated with a business system that is modeled by the data model.

4. The method of claim 1, wherein the traversal path through the data model is generated based on a report query, wherein at least a source data object and a target data object are provided by the report query.

5. The method of claim 1, further comprising, in response to a query that includes a reference to one or more aspect objects, performing actions including:

modifying the traversal path to require each of the one or more aspect objects to be included in the traversal path; and generating report information based on at least the source data object, and the one or more aspect objects.

6. The method of claim 1, wherein the data model is a financial allocation model that further comprises, two or more data objects and one or more aspect objects, wherein the two or more data objects represent categories of cost line items in the financial allocation model.

7. A system for allocation resource for data objects in a business system, comprising:

a network computer, comprising:

a non-transitory computer readable memory that stores at least instructions; and one or more processor devices that execute instructions that perform actions, including:

traversing, by the one or more processors, a data model comprised of nodes and edges that includes the data objects, wherein a traversal path follows one or more allocation rules that are included in the data model, and wherein a data structure for the data model is based on a table data structure for a general ledger dataset that includes a column for general ledger actuals ID and another column for cost for each line item in the table data structure;

employing, by the one or more processors, geolocation information to localize a visual presentation of a user interface that includes one or more of a database or internal processes associated with the data objects in the data model based on a physical location, wherein the localization includes one or more of time zones, languages, currencies, or calendar formatting;

in response to an aspect object encountered during the traversal, the one or more processors retrieve the data model and execute one of the one or more allocation rules to modify the data model by filtering and associating one or more portions of resources from one or more line items of a source data object with one or more line items of the aspect object based on the traversal path that follows the one or more allocation rules, wherein the one or more portions of the resources that are associated with the line items of the aspect object remain available for allocation at the same time to one or more other data objects in the data model; and in response to a data object encountered during the traversal, the one or more processors retrieve the data model and execute another one of the one or more allocation rules to modify the data model by allocating the one or more portions of the resources from the one or more line items of the source data object with one or more line items of the data object based on the other one of the one or more allocation rules, wherein the one or more portions of the resources allocated to the one or more line items of the data object are unavailable for allocation to the one or more other data objects in the data model; and a client computer, comprising:

a memory that stores at least instructions; and one or more processor devices that execute instructions that perform actions, including:

displaying the data model in the user interface.

8. The system of claim 7, wherein the one or more network computer processor devices execute instructions that perform actions, further comprising, generating one or more assignment ratio tables based on the association of the one or more portions of resources from the one or more line items of the source data object with the one or more line items of the aspect object.

9. The system of claim 7, wherein the one or more line items of the aspect object are provided by one or more datasets that are associated with a business system that is modeled by the data model.

10. The system of claim 7, wherein the traversal path through the data model is generated based on a report query, wherein at least a source data object and a target data object are provided by the report query.

11. The system of claim 7, wherein the one or more network computer processor devices execute instructions that perform actions, further comprising, in response to a query that includes a reference to one or more aspect objects, performing actions including:

modifying the traversal path to require each of the one or more aspect objects to be included in the traversal path; and generating report information based on at least the source data object, and the one or more aspect objects.

12. The system of claim 7, wherein the data model is a financial allocation model that further comprises, two or more data objects and one or more aspect objects, wherein the two or more data objects represent categories of cost line items in the financial allocation model.

13. A processor readable non-transitory storage media that includes instructions for allocating resources for data objects in a business system, wherein execution of the instructions by one or more hardware processors perform actions, comprising:

traversing, by the one or more processors, a data model comprised of nodes and edges that includes the data objects, wherein a traversal path follows one or more allocation rules that are included in the data model, and wherein a data structure for the data model is based on a table data structure for a general ledger dataset that includes a column for general ledger actuals ID and another column for cost for each line item in the table data structure;

employing, by the one or more processors, geolocation information to localize a visual presentation of a user interface that includes one or more of a database or internal processes associated with the data objects in the data model based on a physical location, wherein the localization includes one or more of time zones, languages, currencies, or calendar formatting;

in response to an aspect object encountered during the traversal, the one or more processors retrieve the data model and execute one of the one or more allocation rules to modify the data model by filtering and associating one or more portions of resources from one or more line items of a source data object with one or more line items of the aspect object based on the traversal path that follows the one or more allocation rules, wherein the one or more portions of the resources that are associated with the line items of the aspect object remain available for allocation at the same time to one or more other data objects in the data model; and in response to a data object encountered during the traversal, the one or more processors retrieve the data model and execute another one of the one or more allocation rules to modify the data model by allocating the one or more portions of the resources from the one or more line items of the source data object with one or more line items of the data object based on the other one of the one or more allocation rules, wherein the one or more portions of the resources allocated to the one or more line items of the data object are unavailable for allocation to the one or more other data objects in the data model.

14. The media of claim 13, further comprising, generating one or more assignment ratio tables based on the association of the one or more portions of resources from the one or more line items of the source data object with the one or more line items of the aspect object.

15. The media of claim 13, wherein the one or more line items of the aspect object are provided by one or more datasets that are associated with a business system that is modeled by the data model.

16. The media of claim 13, wherein the traversal path through the data model is generated based on a report query, wherein at least a source data object and a target data object are provided by the report query.

17. The media of claim 13, further comprising, in response to a query that includes a reference to one or more aspect objects, performing actions including:

modifying the traversal path to require each of the one or more aspect objects to be included in the traversal path; and generating report information based on at least the source data object, and the one or more aspect objects.

18. The media of claim 13, wherein the data model is a financial allocation model that further comprises, two or more data objects and one or more aspect objects, wherein the two or more data objects represent categories of cost line items in the financial allocation model.

19. A network computer for allocating resources for data objects in a business system, comprising:

a non-transitory computer readable memory that stores at least instructions; and one or more processor devices that execute instructions that perform actions, including:

traversing, by the one or more processors, a data model comprised of nodes and edges that includes the data objects, wherein a traversal path follows one or more allocation rules that are included in the data model, and wherein a data structure for the data model is based on a table data structure for a general ledger dataset that includes a column for general ledger actuals ID and another column for cost for each line item in the table data structure;

employing, by the one or more processors, geolocation information to localize a visual presentation of a user interface that includes one or more of a database or internal processes associated with the data objects in the data model based on a physical location, wherein the localization includes one or more of time zones, languages, currencies, or calendar formatting;

in response to an aspect object encountered during the traversal, the one or more processors retrieve the data model and execute one of the one or more allocation rules to modify the data model by filtering and associating one or more portions of resources from one or more line items of a source data object with one or more line items of the aspect object based on the traversal path that follows the one or more allocation rules, wherein the one or more portions of the resources that are associated with the line items of the aspect object remain available for allocation at the same time to one or more other data objects in the data model; and in response to a data object encountered during the traversal, the one or more processors retrieve the data model and execute another one of the one or more allocation rules to modify the data model by allocating the one or more portions of the resources from the one or more line items of the source data object with one or more line items of the data object based on the other one of the one or more allocation rules, wherein the one or more portions of the resources allocated to the one or more line items of the data object are unavailable for allocation to the one or more other data objects in the data model.

20. The network computer of claim 19, wherein the one or more processor devices execute instructions that perform actions, further comprising, generating one or more assignment ratio tables based on the association of the one or more portions of resources from the one or more line items of the source data object with the one or more line items of the aspect object.

21. The network computer of claim 19, wherein the one or more line items of the aspect object are provided by one or more datasets that are associated with a business system that is modeled by the data model.

22. The network computer of claim 19, wherein the traversal path through the data model is generated based on a report query, wherein at least a source data object and a target data object are provided by the report query.

23. The network computer of claim 19, wherein the one or more processor devices execute instructions that perform actions, further comprising, in response to a query that includes a reference to one or more aspect objects, performing actions including:
  modifying the traversal path to require each of the one or more aspect objects to be included in the traversal path; and
  generating report information based on at least the source data object, and the one or more aspect objects.

24. The network computer of claim 19, wherein the data model is a financial allocation model that further comprises, two or more data objects and one or more aspect objects, wherein the two or more data objects represent categories of cost line items in the financial allocation model.

* * * * *